(12) United States Patent
Högasten et al.

(10) Patent No.: US 10,931,874 B2
(45) Date of Patent: Feb. 23, 2021

(54) BURST MODE CALIBRATION SENSING AND IMAGE MODE SENSING FOR IMAGING SYSTEMS AND METHODS

(71) Applicant: FLIR Commercial Systems, Inc., Goleta, CA (US)

(72) Inventors: Nicholas Högasten, Santa Barbara, CA (US); Brian B. Simolon, Santa Barbara, CA (US); Christopher Chan, Goleta, CA (US); Robert F. Cannata, Santa Barbara, CA (US); Eric A. Kurth, Santa Barbara, CA (US)

(73) Assignee: FLIR COMMERCIAL SYSTEMS, INC., Goleta, CA (US)

( * ) Notice: Subject to any disclaimer, the term of this patent is extended or adjusted under 35 U.S.C. 154(b) by 0 days.

(21) Appl. No.: 16/686,363

(22) Filed: Nov. 18, 2019

(65) Prior Publication Data

US 2020/0186712 A1 Jun. 11, 2020

Related U.S. Application Data

(60) Provisional application No. 62/776,394, filed on Dec. 6, 2018.

(51) Int. Cl.
*H04N 5/232* (2006.01)

(52) U.S. Cl.
CPC ..... *H04N 5/23245* (2013.01); *H04N 5/23216* (2013.01)

(58) Field of Classification Search
CPC ............................ H04N 5/378; H04N 5/2252
See application file for complete search history.

(56) References Cited

U.S. PATENT DOCUMENTS

| 4,689,494 | A | 8/1987 | Chen et al. |
|---|---|---|---|
| 6,175,261 | B1 | 1/2001 | Sundararaman et al. |
| 6,876,594 | B2 | 4/2005 | Griesmer et al. |
| 6,982,751 | B1 | 1/2006 | Tanaka |
| 7,952,691 | B2 * | 5/2011 | Mosier .................... G01S 17/66 356/139.04 |
| 8,139,121 | B2 | 3/2012 | Ito |
| 8,203,109 | B2 * | 6/2012 | Taylor .................. F41H 13/005 250/201.9 |
| 9,410,850 | B2 * | 8/2016 | Novotny .............. H04N 5/3535 |
| 2002/0027604 | A1 | 3/2002 | Hung |
| 2002/0041761 | A1 | 4/2002 | Glotzbach et al. |
| 2003/0007081 | A1 | 1/2003 | Kwon et al. |
| 2004/0081437 | A1 | 4/2004 | Asada et al. |

(Continued)

*Primary Examiner* — Paulos M Natnael
(74) *Attorney, Agent, or Firm* — Haynes and Boone, LLP

(57) ABSTRACT

Techniques are disclosed for facilitating burst mode calibration sensing and image mode sensing. In one example, a device includes a detector array configured to detect electromagnetic radiation and provide image data frames according to a first frame rate. The device further includes a logic circuit configured to determine whether a threshold delay has elapsed. The device further includes a frame output circuit configured to: provide, based at least on the threshold delay having elapsed, the image data frames according to the first frame rate; and provide, based at least on the threshold delay not having elapsed, the image data frames according to a second frame rate lower than the first frame rate. Related methods and systems are also provided.

20 Claims, 13 Drawing Sheets

(56) References Cited

U.S. PATENT DOCUMENTS

| | | |
|---|---|---|
| 2006/0131743 A1 | 6/2006 | Erickson et al. |
| 2006/0136751 A1 | 6/2006 | Bonaccio et al. |
| 2007/0030382 A1 | 2/2007 | Suda |
| 2010/0007784 A1 | 1/2010 | Haneda |
| 2010/0045830 A1 | 2/2010 | Yuyama |
| 2010/0171844 A1 | 7/2010 | Okamoto et al. |
| 2010/0282941 A1* | 11/2010 | Mosier .................. G01S 17/66 250/203.1 |
| 2010/0282942 A1* | 11/2010 | Mosier .................. F41H 13/005 250/203.2 |
| 2011/0058167 A1* | 3/2011 | Knox .................... G01N 15/06 356/338 |
| 2013/0201315 A1 | 8/2013 | Takei et al. |
| 2015/0172529 A1 | 6/2015 | Aota |
| 2015/0172595 A1 | 6/2015 | Furumochi |
| 2016/0213235 A1 | 7/2016 | Hasegawa |
| 2017/0026580 A1 | 1/2017 | Gyotoku |
| 2017/0054922 A1* | 2/2017 | Novotny ........... H01L 21/32134 |
| 2017/0078602 A1* | 3/2017 | Sasaki ................. H01L 27/14634 |
| 2018/0063401 A1 | 3/2018 | Kobuse et al. |
| 2020/0150160 A1* | 5/2020 | Schlesselmann ........ H04N 5/33 |
| 2020/0186736 A1* | 6/2020 | Cannata ................. H04N 5/378 |

\* cited by examiner

BURST MODE CALIBRATION SENSING AND IMAGE MODE SENSING FOR IMAGING SYSTEMS AND METHODS

CROSS REFERENCE TO RELATED APPLICATIONS

This application claims the benefit of and priority to U.S. Provisional Patent Application No. 62/776,394 filed Dec. 6, 2018 and entitled "BURST MODE CALIBRATION SENSING AND IMAGE MODE SENSING FOR IMAGING SYSTEMS AND METHODS," which is incorporated herein by reference in its entirety.

TECHNICAL FIELD

One or more embodiments relate generally to imaging systems and more particularly, for example, to burst mode calibration sensing and image mode sensing for imaging systems and methods.

BACKGROUND

Imaging systems may include an array of detectors, with each detector functioning as a pixel to produce a portion of a two-dimensional image. In some cases, such as for infrared imaging, readout of image data captured by the detectors may be performed in a time-multiplexed manner by a readout integrated circuit (ROIC).

SUMMARY

In one or more embodiments, a device includes a detector array configured to detect electromagnetic radiation and provide image data frames according to a first frame rate. The device further includes a logic circuit configured to determine whether a threshold delay has elapsed. The device further includes a frame output circuit configured to: provide, based at least on the threshold delay having elapsed, the image data frames according to the first frame rate; and provide, based at least on the threshold delay not having elapsed, the image data frames according to a second frame rate lower than the first frame rate.

In one or more embodiments, a method includes detecting, by a detector array, electromagnetic radiation associated with a scene. The method further includes providing, by the detector array, image data frames according a first frame rate. The method further includes determining whether a threshold delay has elapsed. The method further includes providing, by a readout circuit based at least on the threshold delay having elapsed, the image data frames according to the first frame rate. The method further includes providing, by the readout circuit based at least on the threshold delay not having elapsed, the image data frames according to a second frame rate lower than the first frame rate.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
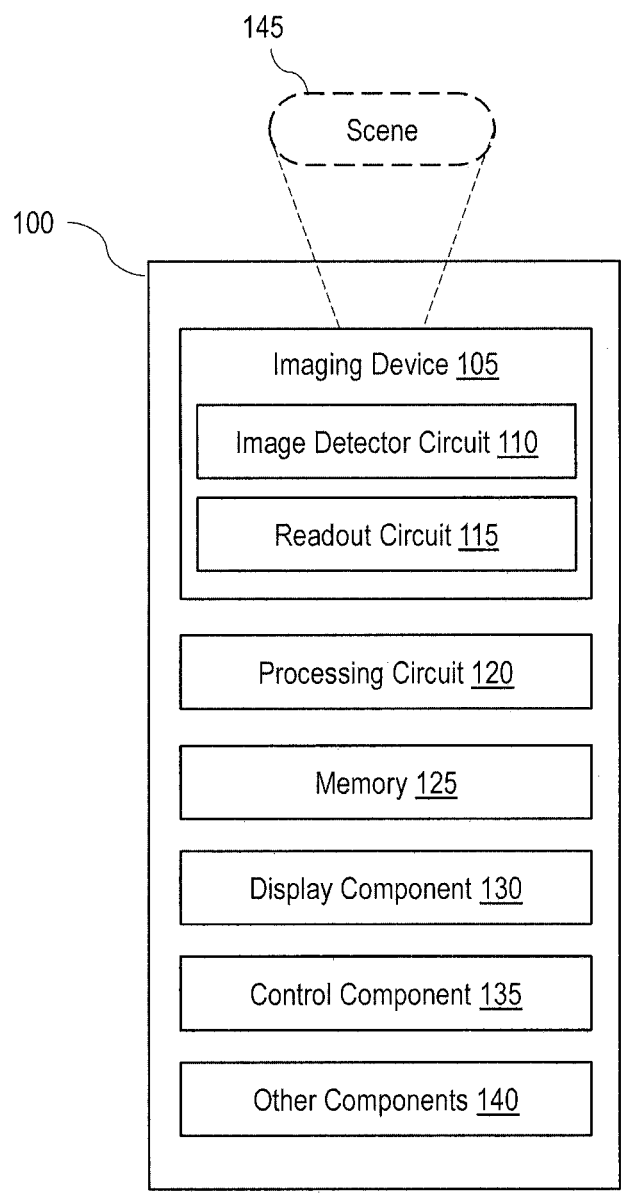
FIG. 1 illustrates a block diagram of an example imaging system in accordance with one or more embodiments of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

In some embodiments, techniques are provided for facilitating burst mode calibration sensing and image mode sensing for imaging systems and associated methods. An imaging device of an imaging system may include an image detector circuit and a readout circuit. The image detector circuit may detect electromagnetic (EM) radiation, generate frames according to a first frame rate, and provide (e.g., output, transmit) such frames to the readout circuit. The image detector circuit may include a detector array (e.g., microbolometer array). In some cases, the generated frames may include data indicative of the EM radiation detected by the image detector circuit. Such data may be referred to as image data or pixel data. The readout circuit may operate at the first frame rate (or higher) to accommodate the frames from the detector circuit. In various embodiments, a frame rate at which the readout circuit provides (e.g., outputs, transmits) frames is based on whether the readout circuit is operating in image mode or burst mode. In an aspect, a combination of the image detector circuit and the readout circuit may be, may include, or may together provide a focal plane array (FPA). In an embodiment, the imaging system may be an infrared (IR) imaging system, such as a thermal IR imaging system in some cases.

During operation of the readout circuit in image mode, the readout circuit may generate, based on a subset of frames from the image detector circuit, frames containing image data and output such frames at a second frame rate lower than the first frame rate. Such frames may be provided downstream of the readout circuit for subsequent processing, storage, and/or display, such as to facilitate a user's particular application for the image data. Components downstream of the readout circuit may include one or more processors (e.g., to perform image processing operations), one or more memories (e.g., to store processed and/or unprocessed image data), and/or display devices. As an example, the first frame rate may be 60 Hz and the second frame rate may be around 9 Hz. In this example, the readout circuit may generate and provide (e.g., output, transmit) one output frame containing image data based on every seventh frame received from the image detector circuit. In some aspects, the readout circuit may generate output frames that do not contain image data for the remaining six frames (e.g., the six frames between every seventh frame). The image data contained in these remaining six frames from the image detector circuit may be nullified (e.g., discarded, ignored, masked, blanked out) by the readout circuit. For example, these remaining six frames may be nullified to remove and/or replace the image data contained in these six frames such that, after nullification, the six frames do not contain the image data. Every seventh frame containing image data may be referred to as an image data frame or a pixel data frame, and each of the remaining six frames may be referred to as blank frames, blanked out frames, non-image data frames, or non-pixel data frames. It is noted the first frame rate of 60 Hz and the second frame rate of 9 Hz (e.g., 8.57 Hz for this specific example) are utilized for explanatory purposes. Other frame rates may be utilized for the first frame rate and the second frame rate, in which case the readout circuit may output more or fewer than six blank frames between two image data frames.

For example, the readout circuit may generate the blank frames by blanking out (e.g., masking) each of the six frames between every seventh frame received from the image detector circuit. In an aspect, the image data captured by the image detector circuit in these frames is blanked out to make the image data completely unavailable at any pad or probeable location. In some cases, a blank frame may include an indication bit to indicate the blank frame is a blank frame (e.g., rather than an image data frame), data indicative a number of frames remaining until a next image data frame, and/or generally any data aside from image data. The blank frames may be provided downstream of the readout circuit, such as to be discarded and/or utilized to facilitate operation of the imaging system. For instance, the blank frames may be utilized for synchronization and/or utilized for other data contained in the blank frames. In some cases, each image data frame and blank frame that is provided (e.g., as output) by the readout circuit may include one or more temperature measurements associated with the imaging system, which may be utilized to monitor operation of the imaging system (e.g., monitor for overheating).

To allow for a faster calibration process, the readout circuit may be operated in burst mode to allow image data frames to be provided (e.g., output, transmitted) by the readout circuit (e.g., to processing electronics of the imaging system downstream of the readout circuit) for calibration purposes at a frame rate higher than the second frame rate. In an aspect, the image data frames utilized for calibration purposes may be provided by the readout circuit at the first frame rate. In this regard, as an example, for a given number of frames to be captured by the image detector circuit for calibration purposes, the calibration process may take around seven times shorter if frames utilized for the calibration are output by the readout circuit at 60 Hz rather than at around 9 Hz.

As a non-limiting example, a calibration process (e.g., also referred to as a calibration event) may be or may include a flat-field correction (FFC) process (e.g., also referred to as an FCC event). FFC generally refers to a calibration technique performed in digital imaging to remove artifacts from frames that are caused by variations in pixel-to-pixel output of the image detector circuit (e.g., variations between individual microbolometers of the image detector circuit) and/or by distortions in an optical path. In an aspect, the FCC event may involve capturing and averaging multiple frames while a shutter of the imaging system is in a closed position to cover the image detector circuit, such that the image detector circuit captures image data of the shutter and is blind to a scene. Such captured frames are accumulated and utilized to update FFC correction terms to be applied to frames output by the readout circuit (e.g., by a processing circuit of the imaging system that receives frames output by the readout circuit) and are generally not provided as an output of the imaging system. In an aspect, such captured frames are accumulated as signals internal to the imaging system and completely unavailable at any pad or probeable location.

During the FFC event, since the shutter blocks the image detector circuit, a user is unable to use the imaging system to capture image data of the scene. A number of frames (e.g., internally generated frames) for calibration and thus a duration of time the shutter blocks the image detector circuit (e.g., the shutter is closed) depends on an output frame rate of the readout circuit. At a lower frame rate (e.g., 9 Hz relative to a higher frame rate such as 60 Hz), the FFC event may be associated with a longer duration of time with the shutter blocking the detector circuit. As the user is unable to use the imaging system to capture image data during the FFC event, such a delay associated with the FFC event may adversely affect user experience and may be highly objectionable in certain applications (e.g., thermal imaging applications) such as firefighting. In addition, for example, if frames are provided for display to the user, an output video may be frozen during the FFC event. In this example, a display included in the imaging system or otherwise coupled to the imaging system may continue to display image data of the scene from right before the FFC event is initiated. In this regard, while a longer FFC event is utilized to capture more frames for calibration purposes to allow better removal of artifacts, a shorter FFC event reduces an amount of time the user is unable to utilize the imaging system for capturing image data. Although in the above example a shutter of the imaging system (e.g., a camera shutter) is positioned to block the image detector circuit, other types of structures may be provided by the imaging system that can be selectively positioned to block the image detector circuit.

Thus, using various embodiments, the readout circuit may be locked to providing frames at a lower frame rate (e.g., 9 Hz) except for a short burst of frames provided at a higher frame rate (e.g., 60 Hz) during operation in burst mode. In some cases, operation of the readout circuit in burst mode may be limited to a predetermined duration during which frames are output at the higher frame rate. After the predetermined duration, a minimum delay (e.g., a cooloff period) may be implemented to separate adjacent instances of operation in burst mode. The predetermined duration and minimum delay may be provided in terms of seconds or frame periods. As an example, for a frame rate of 60 Hz, an example predetermined duration of each instance of burst mode operation may be 15 frame periods or 0.25 seconds, and an example minimum delay may be 1800 frame periods or 30 seconds. In a case that the readout circuit provides frames at 8.57 Hz during image mode and 60 Hz during burst mode, providing 15 frames at 60 Hz during burst mode may bring an average image data frame rate of the imaging system to around 9 Hz (e.g., if desired or required for a particular application or requirement).

Furthermore, in various embodiments, techniques provided herein may be utilized to prevent the imaging system from being used in unintended applications by locking the readout circuit to provide (e.g., output, transmit) frames at a certain frame rate during image mode, while allowing the readout frames to provide frames at a higher frame rate for calibration purposes during burst mode to allow appropriate calibration (e.g., FFC) of the imaging system to be performed within a shorter time duration (relative to if the lower frame rate were used). In some embodiments, the readout circuit and/or associated components of the imaging system may be provided with features as further described herein that mitigate or prevent effects of tampering after manufacture and sale of the product, such as tampering to increase the frame rate.

FIG. 1 illustrates a block diagram of an example imaging system 100 (e.g., an infrared imaging system) in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 100 includes an imaging device 105, a processing circuit 120, memory 125, a display component 130, a control component 135, and/or other components 140. The imaging system 100 may represent any type of camera system that detects one or more ranges (e.g., also referred to as wavebands) of EM radiation and provides representative data (e.g., one or more still image frames or video image frames). The imaging system 100 may include a housing that at least partially encloses components of the imaging system 100, such as to facilitate compactness and protection of the imaging system 100. For example, the solid box labeled 100 in FIG. 1 may represent the housing of the imaging system 100. The housing may contain more, fewer, and/or different components of the imaging system 100 than those depicted in FIG. 1. The imaging system 100 may include a portable device and may be implemented, for example, as a handheld device and/or coupled, in other examples, to various types of vehicles (e.g., a land-based vehicle, a watercraft, an aircraft, a spacecraft, or other vehicle) or to various types of fixed locations (e.g., a home security mount, a campsite or outdoors mount, or other location) via one or more types of mounts. In still another example, the imaging system 100 may be integrated as part of a non-mobile installation to provide image frames to be stored and/or displayed.

The imaging device 105 includes an image detector circuit 110 (e.g., a thermal IR detector circuit) and a readout circuit 115 (e.g., an ROIC). In some aspects, the image detector circuit 110 may capture (e.g., detect, sense) IR radiation with wavelengths in the range from around 700 nm to around 14 µm, or portion thereof. For example, in some aspects, the image detector circuit 110 may be sensitive to (e.g., better detect) mid-wave IR (MWIR) radiation (e.g., EM radiation with wavelength of 3-5 pin) and/or long-wave IR (LWIR) radiation (e.g., EM radiation with wavelength of 7-14 µm), or any desired IR wavelengths (e.g., generally in the 0.7 to 14 µm range). In other aspects, the image detector circuit 110 may capture radiation from one or more other wavebands of the EM spectrum, such as visible-light, ultraviolet light, and so forth.

The image detector circuit 110 may capture an image associated with a scene 145 (e.g., a real world scene). An image capturing frame rate may refer to the rate (e.g., images per second) at which images are detected in a sequence by the image detector circuit 110 and provided to the readout circuit 115. To capture the image, the image detector circuit 110 may detect image data (e.g., in the form of EM radiation) associated with the scene 145 and generate pixel values of the image based on the image data. An image may be referred to as a frame or an image frame. In some cases, the image detector circuit 110 may include an array of detectors that can detect radiation of a certain waveband, convert the detected radiation into electrical signals (e.g., voltages, currents, etc.), and generate the pixel values based on the electrical signals. Each detector in the array may capture a respective portion of the scene 145 and generate a pixel value based on the respective portion captured by the detector. The pixel value generated by the detector may be referred to as an output of the detector. In an aspect, the imaging system 100 (e.g., the imaging device 105 of the imaging system 100) may include one or more optical elements (e.g., mirrors, lenses, beamsplitters, beam couplers, etc.) to direct EM radiation to the image detector circuit 110. In some cases, an optical element may be at least partially within the housing the imaging system 100.

The image may be, or may be considered, a data structure that includes pixels and is a representation of the image data, with each pixel having a pixel value that represents EM radiation emitted or reflected from a portion of the scene 145 and received by a detector that generates the pixel value. Based on context, a pixel may refer to a detector of the image detector circuit 110 that generates an associated pixel value or a pixel (e.g., pixel location, pixel coordinate) of the image formed from the generated pixel values.

In an aspect, the pixel values generated by the image detector circuit 110 may be represented in terms of digital count values generated based on the electrical signals obtained from converting the detected radiation. For example, in a case that the image detector circuit 110 includes or is otherwise coupled to an analog-to-digital converter (ADC) circuit, the ADC circuit may generate digital count values based on the electrical signals. For an ADC circuit that can represent an electrical signal using 14 bits, the digital count value may range from 0 to 16,383. In such cases, the pixel value of the detector may be the digital count value output from the ADC circuit. In other cases (e.g., in cases without an ADC circuit), the pixel value may be analog in nature with a value that is, or is indicative of, the value of the electrical signal. As an example, for infrared imaging, a larger amount of IR radiation being incident on and detected by the image detector circuit 110 (e.g., an IR image detector circuit) is associated with higher digital count values and higher temperatures.

The readout circuit 115 may be utilized as an interface between the image detector circuit 110 that detects the image data associated with the scene 145 and the processing circuit 120 that processes the detected image data as read out by the readout circuit 115. An image output frame rate may refer to the rate (e.g., images per second) at which images are provided (e.g., as output) by the readout circuit 115 (e.g., to the processing circuit 120). The readout circuit 115 may read out the pixel values generated by the image detector circuit 110 in accordance with an integration time (e.g., also referred to as an integration period).

In various embodiments, a combination of the image detector circuit 110 and the readout circuit 115 may be, may include, or may together provide an FPA. In some aspects, the image detector circuit 110 may be a thermal image detector circuit that includes an array of microbolometers, and the combination of the image detector circuit 110 and the readout circuit 115 may be referred to as a microbolometer FPA. In some cases, the array of microbolometers may be arranged in rows and columns. The microbolometers may detect IR radiation and generate pixel values based on the detected IR radiation. For example, in some cases, the microbolometers may be thermal IR detectors that detect IR radiation in the form of heat energy and generate pixel values based on the amount of heat energy detected. The microbolometer FPA may include IR detecting materials such as amorphous silicon (a-Si), vanadium oxide ($VO_x$), a combination thereof, and/or other detecting material(s). In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of heat energy by the microbolometers.

In some cases, the imaging device 105 may include one or more filters adapted to pass radiation of some wavelengths but substantially block radiation of other wavelengths. For example, the imaging device 105 may be an IR imaging device that includes one or more filters adapted to pass IR radiation of some wavelengths while substantially blocking IR radiation of other wavelengths (e.g., MWIR filters, thermal IR filters, and narrow-band filters). In this example, such filters may be utilized to tailor the imaging device 105 for increased sensitivity to a desired band of IR wavelengths. In an aspect, an IR imaging device may be referred to as a thermal imaging device when the IR imaging device is tailored for capturing thermal IR images. Other imaging devices, including IR imaging devices tailored for capturing infrared IR images outside the thermal range, may be referred to as non-thermal imaging devices.

The processing circuit 120 may perform operations to process the pixel values received (e.g., as part of frames) from the readout circuit 115. By way of non-limiting example, the processing circuit 120 may perform operations such as non-uniformity correction (NUC) (e.g., FFC or other calibration technique), spatial and/or temporal filtering, and/or radiometric conversion on the pixel values. The processing circuit 120 may be implemented as any appropriate processing device, such as a central processing unit (CPU), a graphics processing unit (GPU), a digital signal processor (DSP), a logic device, a single-core processor, a multi-core processor, a microcontroller, an application specific integrated circuit (ASIC), a programmable logic device (PLD), a field-programmable gate array (FPGA), a combination thereof, and/or other device. The processing circuit 120 may include combinations of hardware and software processing functionality and may be provided with/in and/or communicatively coupled to other components to execute appropriate instructions, such as software instructions and/or processing parameters (e.g., filtering coefficients, NUC correction terms) stored in the memory 125. In various embodiments, the processing circuit 120 may be configured to execute software instructions stored in the memory 125 to perform various methods, processes, or operations in the manner described herein. In some aspects, the readout circuit 115 and/or processing circuit 120 may include and/or may be coupled to circuitry to generate and provide timing/clock signals and/or control signals for facilitating readout of image data captured by the image detector circuit 110. As an example, such a signal may include an $F_{SYNC}$ signal associated with a start of an image.

The memory 125 may be utilized to store information for facilitating operation of the imaging system 100. The memory 125 may store information such as instructions to be executed by the various components (e.g., the readout circuit 115 and/or processing circuit 120) of the imaging system 100, parameters associated with processing operations, information associated with previously generated images (e.g., for temporal filtering), and/or other information. By way of non-limiting examples, the memory 125 may include non-volatile memory, such as read-only memory (ROM), programmable ROM (PROM), erasable programmable ROM (EPROM), electrically erasable programmable (EEPROM), flash, non-volatile random-access memory (NVRAM), etc. The memory 125 may include volatile memory, such as random-access memory (RAM), dynamic RAM (DRAM), static RAM (SRAM), etc. In some aspects, the memory 125, or a portion thereof, may be external to the imaging system 100 (e.g., an external memory accessible by the imaging system 100).

The display component 130 (e.g., screen, touchscreen, monitor) may be used to display captured and/or processed images and/or other images, data, and/or information (e.g., legend relating color in the images with temperatures). For example, the images (or a visual representation of the images) may be displayed as individual static images and/or as a series of images in a video sequence.

The control component 135 may include a control panel unit (e.g., a wired or wireless handheld control unit) having one or more user-activated mechanisms (e.g., buttons, knobs, sliders, keyboard, or others) adapted to interface with a user and receive user input (e.g., press of a button, turn of a knob, etc.). The processing circuit 120 may be adapted to sense control input signals from the control component 135 and respond to any sensed control input signals received therefrom. The one or more user-activated mechanisms of the control panel unit may be utilized to select between various modes of operation, such as to transition operation of the readout circuit 115 to burst mode operation. In addition, the control panel unit may be adapted to include one or more user-activated mechanisms to provide various other control operations of the imaging, system 100, such as auto-focus, menu enable and selection, field of view (FOV), brightness, contrast, gain, offset, spatial, temporal, and/or various other features and/or parameters.

In some cases, the control component 135 may include a graphical user interface (GUI), which may be integrated as part of the display component 130 (e.g., a user actuated touchscreen) having one or more images of the user-activated mechanisms (e.g., buttons, knobs, sliders, or others), which are adapted to interface with a user and receive user input via the display component 130 (e.g., using a gesture). As an example for one or more embodiments, the display component 130 and control component 135 may represent appropriate portions of a smartphone, a tablet, a personal digital assistant, a laptop computer, a desktop computer, or other type of device.

In addition, the imaging system 100 may include other components 140. By way of non-limiting examples, the other components 140 may be used to implement any features of the imaging system 100 as may be desired for various applications, such as clocks, batteries, motion sensors, temperature sensors, one or more additional imaging devices (e.g., to capture same or different wavebands than the imaging device 105), communications components, and/or other components. As one example, motion sensors may be implemented by one or more accelerometers, gyroscopes, and/or other appropriate devices that may be used to detect movement of the imaging system 100. The information provided by the motion sensors may facilitate image processing operations (e.g., spatial filtering, temporal filtering) performed by the processing circuit 120, such as by facilitating differentiation between motion in the scene relative to motion of the imaging system 100. As another example, temperature sensors may be utilized to perform one or more temperature readings of the imaging system 100, such as to determine whether one or more portions of the imaging system 100 are operating properly (e.g., not overheating). As another example, communications components may facilitate wired and/or wireless communication between components within the imaging system 100 and/or between the imaging system 100 and other systems. Examples of communications components may include components (e.g., interfaces, connections) for facilitating communication using Universal Serial Bus (USB), Ethernet, WiFi, Bluetooth, cellular, infrared, radio, and/or other wired or wireless protocols.

Figure 2:
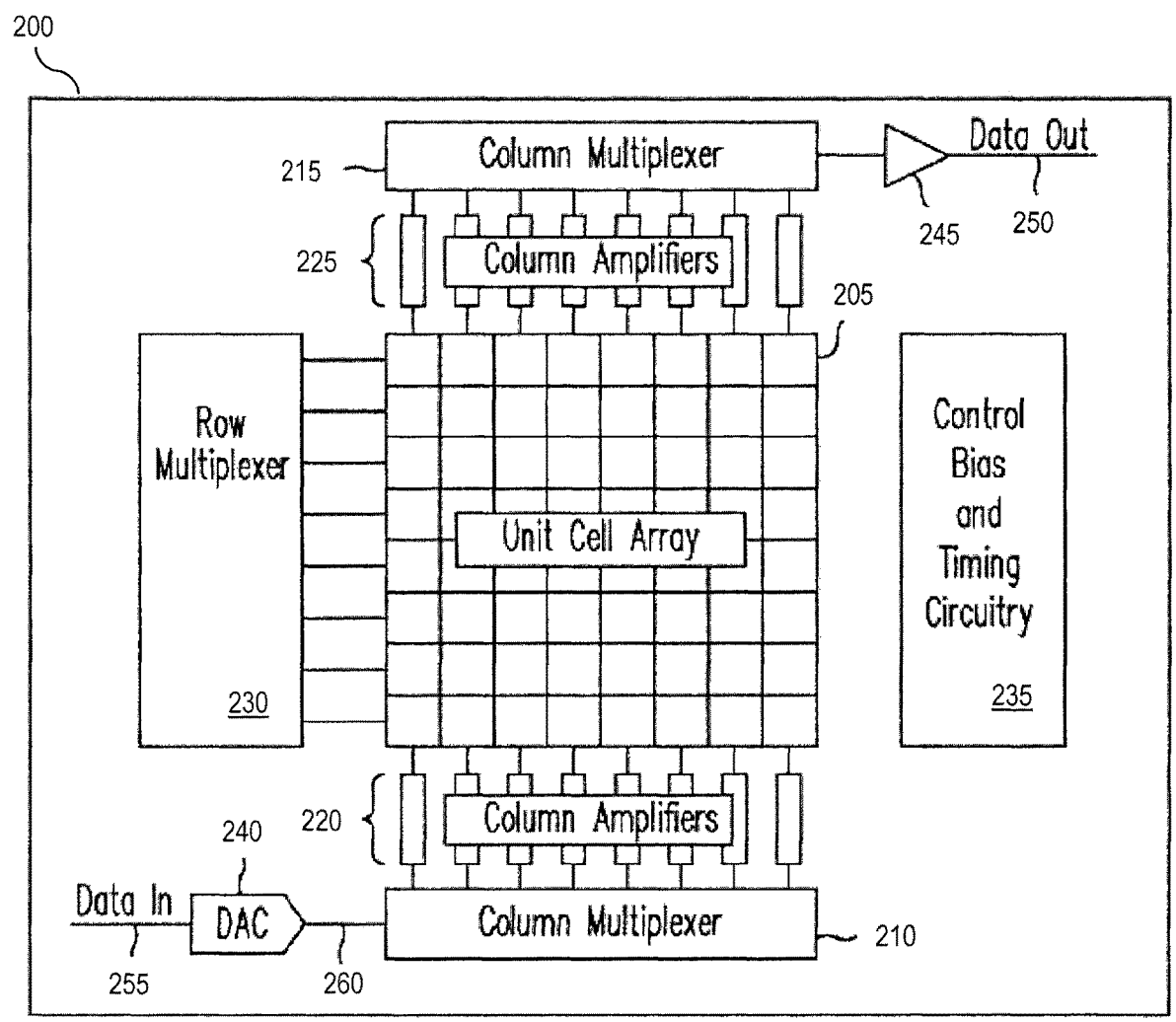
FIG. 2 illustrates a block diagram of an example focal plane array in accordance with one or more embodiments of the present disclosure.

FIG. 2 illustrates a block diagram of an example FPA 200 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the FPA 200 may include, may be a part of, and/or may be collectively provided by the image detector circuit 110 and readout circuit 115.

The FPA 200 includes a unit cell array 205, column multiplexers 210 and 215, column amplifiers 220 and 225, a row multiplexer 230, control bias and timing circuitry 235, a digital-to-analog converter (DAC) 240, and a data output buffer 245. The unit cell array 205 includes an array of unit cells. In an aspect, each unit cell may include a detector and an interface circuitry. The interface circuitry of each unit cell may provide an output signal, such as an output voltage or current, in response to a detector signal (e.g., detector current, detector voltage) provided by the detector of the unit cell. The output signal may be indicative of the magnitude of EM radiation received by the detector. The column multiplexer 215, column amplifiers 220, row multiplexer 230, and data output buffer 245 may be used to provide the output signals from the unit cell array 205 as a data output signal on a data output line 250. The output signals on the data output line 250 may be provided to components downstream of the FPA 200, such as processing circuitry (e.g., the processing circuit 120), memory (e.g., the memory 125), display device (e.g., the display component 130), and/or other component. The data output signal may be an image formed of the pixel values for the FPA 200. In this regard, the column multiplexer 215, column amplifiers 220, row multiplexer 230, and data output buffer 245 may collectively provide an ROIC (or portion thereof) of the FPA 200. In an embodiment, signals provided on the data output line 250 may include image data frames and blank frames.

In an aspect, the column amplifiers 225 may generally represent any column processing circuitry as appropriate for a given application (analog and/or digital), and is not limited to amplifier circuitry for analog signals. In this regard, the column amplifiers 225 may more generally be referred to as column processors in such an aspect. As an example, during operation of the FPA 200 in image mode, the column amplifiers 225 may perform operations to generate blank frames by blanking out image data received from the unit cells of the unit cell array 205, and generate image data frames by processing (e.g., scaling, applying gain) or leaving unprocessed image data received from the unit cells of the unit cell array 205. The blank frames and image data frames may be provided on the data output line 250 via the column multiplexers 215 and data output buffer 245.

Signals received by the column amplifiers 225, such as analog signals on an analog bus and/or digital signals on a digital bus, may be processed according to the analog or digital nature of the signal. As an example, the column amplifiers 225 may include circuitry for processing digital signals. As another example, the column amplifiers 225 may be a path (e.g., no processing) through which digital signals from the unit cell array traverses to get to the column multiplexer 215. As another example, the column amplifiers 225 may include an ADC for converting analog signals to digital signals. These digital signals may be provided to the column multiplexer 215.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 235 may generate the bias signals and provide them to the unit cells. By providing appropriate bias signals to each unit cell, the unit cell array 205 may be effectively calibrated to provide accurate image data in response to light (e.g., IR light) incident on the detectors of the unit cells.

The control bias and timing circuitry 235 may generate bias values, timing control voltages, and switch control voltages. In some cases, the DAC 240 may convert the bias values received as, or as part of, data input signal on a data input signal line 255 into bias signals (e.g., analog signals on analog signal line(s) 260) that may be provided to individual unit cells through the operation of the column multiplexer 210, column amplifiers 220, and row multiplexer 230. In another aspect, the control bias and timing circuitry 235 may generate the bias signals (e.g., analog signals) and provide the bias signals to the unit cells without utilizing the DAC 240. In this regard, some implementations do not include the DAC 240, data input signal line 255, and/or analog signal line(s) 260. In an embodiment, the control bias and timing circuitry 235 may be, may include, may be a part of, or may otherwise be coupled to the readout circuit 115 and/or processing circuit 120 of FIG. 1.

In an aspect, the FPA 200 may be implemented as part of an imaging system (e.g., the imaging system 100). In addition to the various components of the FPA 200, the imaging system may also include one or more processors, memories, logic, displays, interfaces, lenses, and/or other components as may be appropriate in various implementations. In an aspect, the data output signal on the data output line 250 may be provided to the processors (not shown) for further processing. For example, the data output signal may be an image formed of the pixel values from the unit cells of the FPA 200. The processors may perform operations such as NUC, spatial and/or temporal filtering, and/or other operations. The images (e.g., processed images) may be stored in memory (e.g., external to or local to the imaging system) and/or displayed on a display device (e.g., external to and/or integrated with the imaging system).

By way of non-limiting examples, the unit cell array 205 may include 512×512 (e.g., 512 rows and 512 columns of unit cells), 1024×1024, 2048×2048, 4096×4096, 8192×8192, and/or other array sizes. In some cases, the array size may have a row size (e.g., number of detectors in a row) different from a column size (e.g., number of detectors in a column). Examples of frame rates may include 30 Hz, 60 Hz, and 120 Hz.

Figure 3:
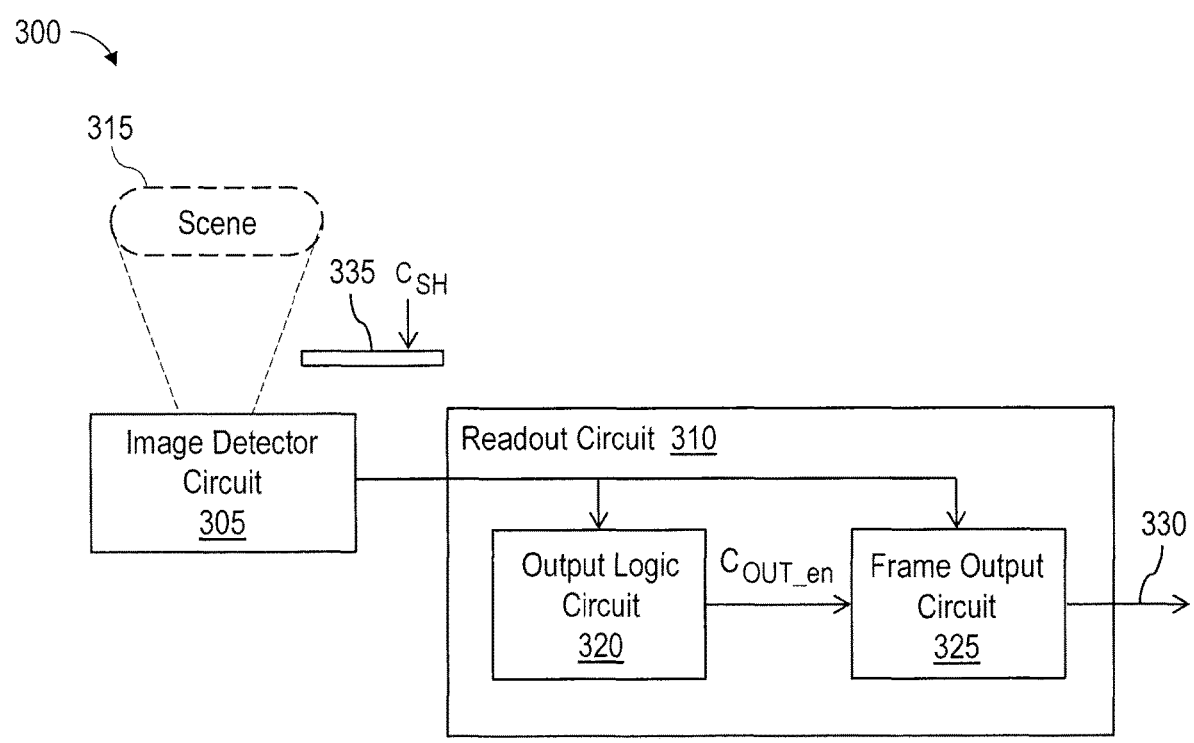
FIG. 3 illustrates an example imaging device in accordance with one or more embodiments of the present disclosure.

FIG. 3 illustrates an example imaging device 300 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the imaging device 300 may be a part of the imaging system 100 of FIG. 1. For example, the imaging device 300 may be, may include, or may be a part of, the imaging device 105 of FIG. 1.

The imaging device 300 includes an image detector circuit 305 and a readout circuit 310. The image detector circuit 305 may include an array of detectors (e.g., array of microbolometers) to detect EM radiation associated with a scene 315 and provide frames containing pixel values according to a first frame rate (e.g., any desired frame rate). In an embodiment, the first frame rate may be approximately between 30 Hz and 90 Hz. As an example, the first frame rate may be 60 Hz. The detectors of the image detector circuit 305 may be configured to detect EM radiation from one or more wavebands based on application (e.g., IR imaging application, visible-light imaging application, ultraviolet imaging application, etc.). In one example, the imaging device 300 may be an IR imaging device, in which case the detectors may be configured to detect IR radiation, such as MWIR, LWIR, or other IR wavelengths (e.g., short-wave IR (SWIR)) and generate frames based on the detected IR radiation. In another example, the imaging device 300 may be a visible-light imaging device, in which case the detectors may be configured to detect visible-light and generate frames based on the detected visible-light.

The readout circuit 310 includes an output logic circuit 320 and a frame output circuit 325. The output logic circuit 320 may generate control signals to effectuate operation of the readout circuit 310 in image mode or burst mode. The output logic circuit 320 may receive the frames (or portion thereof) from the image detector circuit 305, determine whether data of a given frame generated by the image detector circuit 305 is to be output by the frame output circuit 325, and generate a control signal $C_{OUT\_en}$ for the frame output circuit 325 based on the determination. The determination of whether data of a given frame is to be output by the frame output circuit 325 is based at least on whether the readout circuit 310 is operating in image mode or burst mode. In an aspect, the control signal $C_{OUT\_en}$ may cause the frame output circuit 325 to provide (e.g., output, transmit) a blank frame or an image data frame. For example, the control signal $C_{OUT\_en}$ may be a bit that is in a first state (e.g., logic high, bit value 1) to cause the frame output circuit 325 to provide a blank frame and a second state (e.g., logic low, bit value 0) to cause the frame output circuit 325 to provide an image data frame.

The frame output circuit 325 may receive the control signal $C_{OUT\_en}$ from the output logic circuit 320 and provide output frames according to the control signal $C_{OUT\_en}$. The frame output circuit 325 may selectively provide a blank frame or an image data frame onto an output line 330. In an aspect, when the control signal $C_{OUT\_en}$ is asserted (e.g., logic high), the frame output circuit 325 may output an image data frame. In image mode, the image data frame contains image data of the scene 315 captured by the image detector circuit 305. In burst mode, the image data frame contains image data (e.g., to be utilized as calibration data) of a shutter 335 captured by the image detector circuit 305. When the control signal $C_{OUT\_en}$ is deasserted (e.g., logic low), the frame output circuit 325 may blank out image data captured by the image detector circuit 305 to obtain (e.g., generate) blank frames. The output line 330 may be coupled to components downstream of the readout circuit 310.

Components downstream of the readout circuit 310 may include one or more processors (e.g., to perform image processing operations), one or more memories (e.g., to store processed and/or unprocessed image data), and/or display devices. In some cases, each frame output onto the output line 330 by the readout circuit 310 may include data indicative of whether the frame is an image data frame or a blank frame. In some cases, the components downstream of the readout circuit 310 may identify blank frames and discard them without further processing. In other cases, the components downstream of the readout circuit 310 may utilize presence of the blank frames and/or data contained in the blank frames to facilitate operation of the imaging system. As an example, each image data frame and blank frame that is output by the readout circuit 310 may include one or more temperature measurements associated with the imaging system, which may be utilized by the components downstream of the readout circuit 310 to monitor operation of the imaging system (e.g., monitor for overheating).

A control signal $C_{SH}$ may be utilized to selectively cause the shutter 335 to block the EM radiation of the scene 315 from the image detector circuit 305, such as for calibration purposes (e.g., FFC event). In some cases, when burst mode is initiated, the control signal $C_{SH}$ may be set to cause the shutter 335 to block the image detector circuit 305. For example, the control signal $C_{SH}$ may be provided to an actuator to cause the actuator to move the shutter 335 such that the shutter 335 blocks the scene 315 from the image detector circuit 305. With the shutter 335 blocking the image detector circuit 305, the image detector circuit 305 captures image data of the shutter 335. The readout circuit 310 provides image data frames containing image data of the shutter 335 onto the output line 330. These image data frames may be utilized for calibration purposes (e.g., FFC) and are generally not provided (e.g., stored, displayed) for user consumption. For example, processing electronics downstream of the readout circuit 310 may receive these pixel data frames and update FFC correction terms based on these received frames. Once a sufficient amount of image data of the shutter 335 has been captured, the shutter 335 can be positioned such that the shutter 335 does not block the scene 315 from the image detector circuit 305 (e.g., the image detector circuit 305 is exposed to the scene 315). The FFC correction terms may be applied by the processing electronics to image data frames containing data associated with the scene 315 (e.g., provided by the readout circuit 310 when the imaging device 300 is operating in image mode).

In some cases, for a given frame, one or more processing circuits downstream of the readout circuit 310 may receive the frame from the readout circuit 310 and determine whether the frame is an image data frame containing data of the scene 315, an image data frame containing calibration data (e.g., data of the shutter 335), or a blank frame. Image data frames containing image data of the scene 315 may be processed, provided to memory (e.g., the memory 125), and/or provided to a display device (e.g., the display component 130) for display to a user. Image data frames containing calibration data may be processed appropriately to generate calibration parameters that can be applied to subsequent image data frames containing image data of the scene 315 (e.g., for enhanced image quality). These image data frames containing calibration data are generally not provided for user consumption. In this regard, these frames are not provided for storage for the user's retrieval and not provided for display to the user.

In image mode, the output logic circuit 320 may receive a frame (or portion thereof) from the image detector circuit 305, determine whether the frame output circuit 325 is to provide an image data frame associated with the frame from the image detector circuit 305 or a blank frame, and generate the control signal $C_{OUT\_en}$ for the frame output circuit 325 based on the determination. In this regard, the control signal $C_{OUT\_en}$ may selectively cause the frame output circuit 325 to blank out a frame received from the image detector circuit 305. A state of the control signal $C_{OUT\_en}$ may be set by the output logic circuit 320 to allow frames to be output by the frame output circuit 325 at the second frame rate (e.g., less than 10 Hz) lower than the first frame rate (e.g., 60 Hz). For example, the control signal $C_{OUT\_en}$ may be in a first state when the frame output circuit 325 is to provide a blank frame and a second state when the frame output circuit 325 is to provide a pixel data frame. In one aspect, the output logic circuit 320 may detect end of frames (EOFs) associated with the frames generated by the image detector circuit 305.

Figure 4:
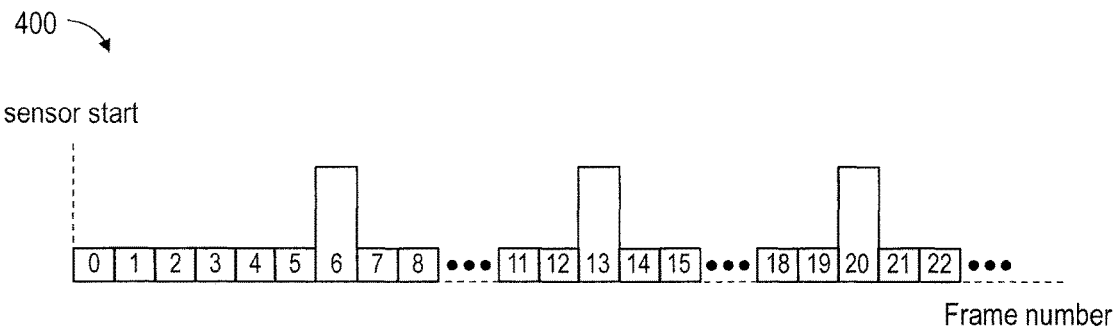
FIGS. 4 and 5 illustrate example output streams of a readout circuit in accordance with one or more embodiments of the present disclosure.
Figure 5:
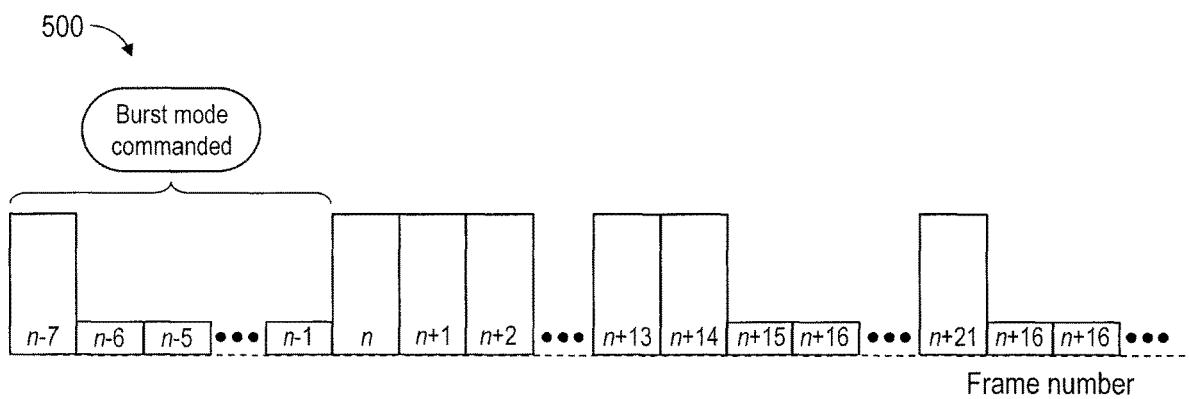

As examples, FIGS. 4 and 5 illustrate output streams 400 and 500, respectively, of the readout circuit 310 (e.g., the frame output circuit 325) in accordance with one or more embodiments of the present disclosure. In FIGS. 4 and 5, the image detector circuit 305 generates frames according to the first frame rate of 60 Hz and provides these frames to the readout circuit 310, whereas the readout circuit 310 operates at the first frame rate of 60 Hz (or higher) and provides frames based on whether the readout circuit 310 is operating in image mode or burst mode. In image mode, as illustrated in FIG. 4, the readout circuit 310 may output frames at a second frame rate of around 9 Hz on the output line 330. As illustrated in FIG. 5, the readout circuit 310 may output frames at the first frame rate of 60 Hz on the output line 330 for a duration that the readout circuit 310 is operating in burst mode (i.e., between frame periods n through n+14). It is noted that, in both image mode and burst mode, the image detector circuit 305 and the readout circuit 310 provide frames according to the first frame rate. In this regard, the readout circuit 310 provides pixel data frames at the second frame rate and blank frames at an average frame rate between the first and second frame rates. In an aspect, when the image detector circuit 305 includes an array of microbolometers, the microbolometers are biased according to the first frame rate.

Turning first to FIG. 4, FIG. 4 illustrates the output stream 400 of the readout circuit 310 when the readout circuit 310 operates in image mode. As illustrated in FIG. 4, during operation of to the imaging device 300 (e.g., the readout circuit 310) in image mode, the readout circuit 310 generates and outputs one image data frame for every seven frame periods. The image data frame may be generated based on a corresponding frame containing image data of the scene 315 captured by the image detector circuit 305. In this regard, the output frame rate of the readout circuit 310 is around 8.57 Hz (i.e., 60 Hz/7) or, equivalently, a period between adjacent pixel data frames is is around 11.7 ms. As such, in FIG. 4, the image data frames have frame numbers 6, 13, 20, 27, and so forth. In the six frames (e.g., occupying six frame periods) between adjacent pixel data frames, image data captured by the image detector circuit 305 is blanked out (e.g., masked) by the readout circuit 310. These blank frames are thus independent of the image data captured by the image detector circuit 305. In an aspect, the blank frames provided by the readout circuit 310 are completely unavailable at any pad or probeable location. A frame period for a given blank frame or a given pixel data frame is 16 ms. A frame number of 0 may be a first frame captured by the image detector circuit 305 and provided to the readout circuit 310 upon turning on the image detector circuit 305 at a time depicted as "sensor start" in FIG. 4. In this regard, each time the imaging device 300 is powered on, the readout circuit 310 begins by outputting six blank frames prior to outputting its first image data frame.

Figure 6:
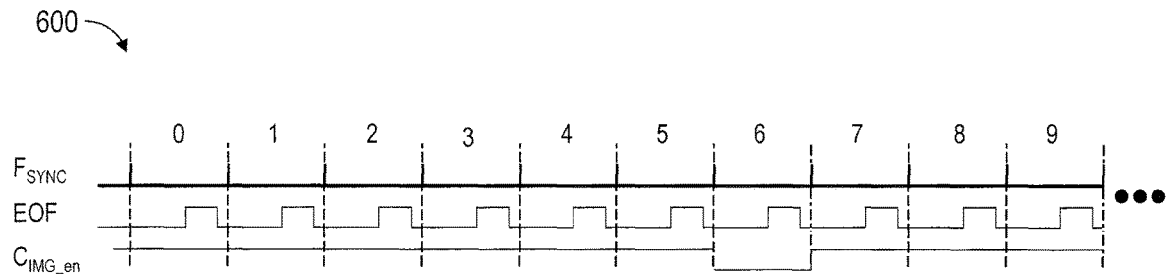
FIG. 6 illustrates an example timing diagram for signals associated with the output stream of FIG. 4 in accordance with one or more embodiments of the present disclosure.

As an example, FIG. 6 illustrates a timing diagram 600 for associated signals (e.g., timing signals) for frame numbers 0 to 9 of the output stream 400 of FIG. 4 in accordance with one or more embodiments of the present disclosure. The timing diagram 600 for frame numbers 0 to 6 repeats for frame numbers 7-13, 14-20, and so forth. As shown in the timing diagram 600, each frame is associated with an $F_{SYNC}$ signal associated with a start of the frame, EOF signal associated with an end of the frame, and an image enable signal $C_{IMG\_en}$ indicative of whether the frame number is associated with a blank frame (e.g., $C_{IMG\_en}$ is logic high) or an image data frame (e.g., $C_{IMG\_en}$ is logic low).

In some cases, to ensure that only every seventh frame is an image data frame, EOF signals may be monitored to ensure a fixed amount of time passes between each frame. For example, an EOF signal associated with each frame may be detected and/or counted (e.g., at a counter implemented as part of the output logic circuit 320). In some cases, the image enable signal $C_{IMG\_en}$ may be, or may be used to derive, a control signal to cause the readout circuit 310 to provide a blank frame or an image data frame. For counter values of 0 to 5, the readout circuit 310 may provide blank frames. For example, for counter values of 0 to 5, the output logic circuit 320 may generate the image enable signal $C_{IMG\_en}$ having a logic high state to cause the frame output circuit 325 to provide blank frames. For a counter value of 6, the output logic circuit 320 may generate the image enable signal $C_{IMG\_en}$ having a logic low state to cause the frame output circuit 325 to provide an image data frame based on image data contained in a corresponding frame from the image detector circuit 305. Similarly, the readout circuit 310 may provide blank frames for counter values of 7-12 and an image data frame for a counter value of 13, and so forth. In some cases, a counter may be utilized to count from 0 to 6 and increment by 1 for each EOF detected, and then roll back from 6 to 0 upon detecting an EOF when the counter value is 6. For example, the counter may be implemented using an operation m modulo 7, where m is the frame number.

During operation of the readout circuit 310 in image mode, the readout circuit 310 is locked to providing image data frames at a lower frame rate of 8.57 Hz relative to the 60 Hz at which the frames are being provided by the image detector circuit 305. In some aspects, the EOF is counted to ensure that a frame is counted when an end of the frame has been reached. For example, when the image detector circuit 305 has 512×512 pixels, a full frame time is the amount of time to read out all 512 rows of pixels and the end of the frame has been reached when all 512 rows of pixels have been read out.

For facilitating operation of the readout circuit 310, the image data frames and the blank frames provided (e.g., generated and output) by the readout circuit 310 may include an indication bit (e.g., as a least significant bit) that identifies whether the frame is an image data frame or a blank frame. For example, the bit may be a logical high when a frame is a blank frame and a logical low when the frame is an image data frame. The image data frame may include at least the indication bit and data indicative of the image data captured by the image detector circuit 305. As for the blank frames, the blank frames may include the indication bit and additional data associated with facilitating operation (e.g., facilitating timing) of the readout circuit 310 in image mode or burst mode. For example, the additional data may include data indicative of a number of blank frames left until a next image data bit is to be output by the readout circuit 310 and/or data (e.g., a bit) indicative of whether burst mode can be initiated.

Turning now to FIG. 5, FIG. 5 illustrates the output stream 500 of the readout circuit 310, in which a command to initiate operation of the readout circuit 310 in burst mode is received at some time instance between frame periods associated with frame numbers n−7 and n−1. Upon the command being received, the readout circuit 310 may initiate operation in burst mode starting at a frame period associated with a next image data frame (e.g., at frame number n in FIG. 5). As an example, the command may be based on user input to the control component 135 of FIG. 1. In this example, the user input may be received via a typed command, a press of a button, and/or other interactive element provided to the user to allow the user to provide the user input.

At frame number n, in which burst mode is initiated, the shutter 335 may be positioned to block the image detector circuit 305 (e.g., a shutter closes over the image detector circuit 305) and then a burst of image data frames (e.g., Z number of frames) capturing the shutter 335 is output by the readout circuit 310 for calibration purposes. In this regard, a burst of image data frames may be provided by the readout circuit 310 only when the shutter 335 is blocking the image detector circuit 305. As an example, in FIG. 5, burst mode operation causes consecutive fifteen image data frames (e.g., frames having frame numbers n to n+14) to be provided on the output line 330. These fifteen frames provided on the output line 330 include image data collected by the image detector circuit 305 from imaging the shutter 335 and may be utilized to perform calibration operations, such as FFC operations. In some cases, the fifteen frames are signals internal to the imaging device 300 (e.g., these frames do not exist at an output of the imaging device 300) and may be unavailable at any pad or probeable location. In some cases, rather than initiate burst mode at a frame number associated with a next image data frame (e.g., the frame number n) as shown in FIG. 5, a random or pseudorandom delay may be implemented before transitioning from image mode to burst mode. Utilizing the random or pseudorandom delay may prevent a time duration during which the readout circuit 310 outputs at the higher frame rate from being predicted and exploited.

In an aspect, after completion of an instance of burst mode operation (e.g., after fifteen consecutive pixel data frames in FIG. 5), a minimum delay needs to elapse before a next instance of burst mode operation is allowed. After the delay, a signal may be generated (e.g., in the readout circuit 310 or other processing circuit) to permit the readout circuit 310 to initiate burst mode operation. Such a signal may be referred to as a burst mode ready signal or a burst mode ready flag. In this regard, the readout circuit 310 can initiate burst mode operation upon receiving a user command to initiate burst mode operation when the burst mode ready signal is in an asserted state (e.g., logic high) and is not allowed to initiate burst mode operation upon receiving the user command when the burst mode ready signal is in a deasserted state (e.g., logic low). Following completion of an instance of burst mode operation, the burst mode ready flag is reset and the minimum delay (e.g., timer or frame counter) begins to elapse.

If a command to initiate operation in burst mode is received between n and n+14 and/or within before the minimum delay has elapsed after n+14, the command may be ignored. In one case, the command may be discarded such that the user needs to send a command after the delay has is elapsed in order to initiate burst mode. In another case, the command may be buffered such that burst mode is initiated after the delay has elapsed (e.g., without further user input). In this regard, in one case, the readout circuit 310 may ignore any command sent to the readout circuit 310 to initiate burst mode operation prior to the burst mode ready signal being set (e.g., being in asserted or logic high state). In another case, the readout circuit 310 may receive the command prior to the burst mode ready signal being set (e.g., being in asserted or logic high state) and automatically initiate burst mode operation when the burst mode ready signal is set (e.g., with or without a random or pseudorandom delay).

By way of non-limiting example, the delay may be implemented as a minimum amount of time (e.g., X seconds) that needs to elapse or a minimum number of frames (e.g., Y frames) that needs to be output by the readout circuit 310 before a next instance of operation in burst mode can be initiated. The minimum number of frames may be a minimum number of image data frames or a minimum number of total frames (e.g., including both image data frames and blanked frames). As one example, a counter (e.g., implemented in the output logic circuit 320) may count a number of image data frames before a next instance of burst mode operation may be initiated. In this regard, the number of image data frames may be counted rather than the number of total data frames, since a smaller counter (e.g., smaller amount of memory and/or associated circuitry) may be implemented to count the number of image data frames. Alternatively or in addition, a timer (e.g., implemented in the output logic circuit 320) may track an amount of time that has elapsed since the most recently completed instance of burst mode operation. Once the number of image data frames has been reached (e.g., in the counter) or the amount of time has elapsed (e.g., in the timer), an earliest instance that operation in burst mode may be initiated may be at a next image data frame. As an example, the minimum amount of time may be 30 seconds or around 258 image data frames. In this example, a timer and/or an image data frame counter may be utilized to implement this minimum amount of time.

Although the foregoing provides examples in which the minimum delay between two instances of operating in burst mode is implemented by tracking a time elapsed or a number of frames since the most recently completed instance of burst mode operation, other manners by which to implement the minimum delay can be utilized. In an aspect, regardless of how the minimum delay is implemented, a random or pseudorandom delay may be implemented on top of the minimum delay to cause a time at which the burst mode is initiated to be less predictable.

Similarly, in an aspect, a minimum delay may be implemented after powering on the imaging system. In this regard, upon powering on the imaging device 300 (e.g., a portion of the imaging device 300 associated with operation of the image detector circuit 305 and the readout circuit 310), at least the minimum delay needs to elapse before a first instance of burst mode operation since power-on can be initiated. The minimum delay may be, but need not be, the same as the minimum delay between adjacent instances of burst mode operation. Counter values and/or timer values are reset upon powering on and shutting down the imaging device 300, such that the minimum delay until the readout circuit 310 outputs a first image data frame cannot be shortened.

In some aspects, with the image detector circuit 305 providing frames at the first frame rate of 60 Hz and the readout circuit 310 providing frames at a frame rate of around 8.57 Hz in image mode and fifteen consecutive image data frames at 60 Hz in burst mode, an average image data frame rate of the readout circuit 310 is around 9 Hz. It is noted that such frame rates and average image data frame rates are provided by way of non-limiting examples. For instance, the readout circuit 310 may be configured to output fewer or more than fifteen consecutive frames at the first frame rate during burst mode operation. More generally, a frame rate associated with the image detector circuit 305 and/or readout circuit 310, frame rates associated with image mode operation and burst mode operation, an appropriate number of frames utilized for calibration, among others, are generally application specific.

In a case that image data frames containing image data of the scene 315 are displayed to a user in real time, a most recent image data frame containing image data of the scene 315 may continue to be displayed to the user (e.g., frozen on the display device) while blank frames are being output by the readout circuit 310. The display device may be updated when the next image data frame is output by the readout circuit 310. As the frame displayed to the user is frozen until the next image data frame containing image data of the scene 315 is provided onto the output line 330, a shorter time duration for operating the readout circuit 310 for calibration purposes is generally desirable in terms of user experience.

Figure 7:
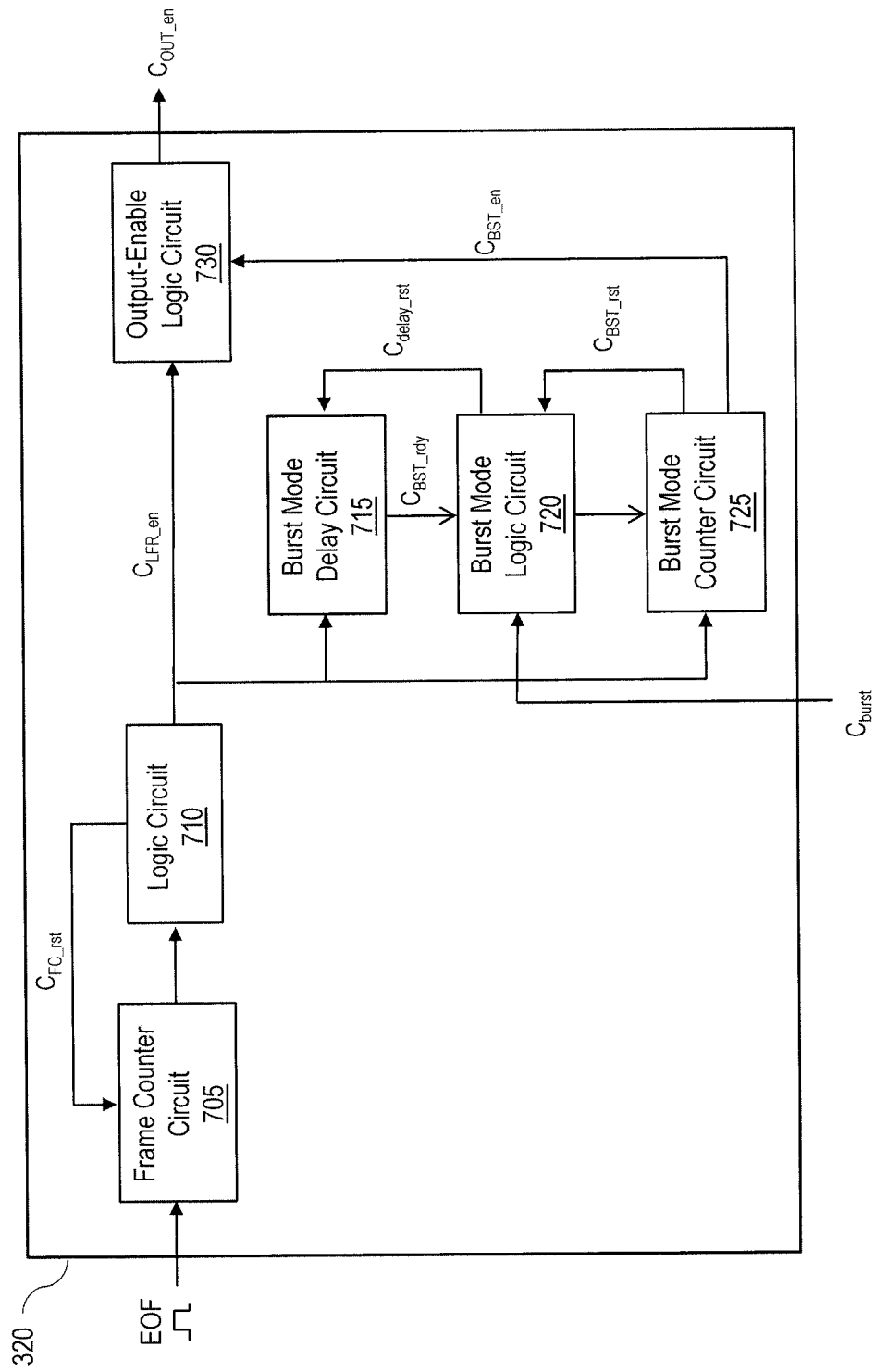
FIG. 7 illustrates an example output logic circuit in accordance with one or more embodiments of the present disclosure.

FIG. 7 illustrates an example of the output logic circuit 320 of FIG. 3 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

In some embodiments, the output logic circuit 320 (or components thereof) may be implemented as any appropriate processing device, such as a CPU, a GPU, a DSP, a logic device, a microcontroller, an ASIC, a PLD, an FPGA, a combination thereof, and/or other device. The output logic circuit 320 may include combinations of hardware and software processing functionality and may be provided with/in and/or communicatively coupled to other components to execute appropriate instructions, such as software instructions and/or processing parameters stored in a memory. In various embodiments, the output logic circuit 320 may be configured to execute software instructions stored in the memory to perform various methods, processes, or operations in the manner described herein. In an embodiment, the output logic circuit 320 may be, may include, or may be implemented as a part of, the readout circuit 115 and/or the processing circuit 120 of FIG. 1.

For explanatory purposes only, the readout circuit 310 outputs frames in accordance with the output streams 400 and 500 shown in FIGS. 4 and 5, respectively. For example, the image detector circuit 305 generates frames and outputs the frames according to a first frame rate of 60 Hz and provides these frames to the readout circuit 310. In image mode, the readout circuit 310 may output frames, including the image data frames and the blank frames, at the first frame rate. In some cases, the image data frames may be output at a second frame rate lower than the first frame rate, and the blank frames may be output at an average frame rate between the first and second frame rates. For example, the readout circuit 310 may provide (e.g., output, transmit) image data frames at the second frame rate of around 9 Hz. In burst mode, the readout circuit 310 may output fifteen consecutive image data frames at the first frame rate of 60 Hz.

The output logic circuit 320 may include a frame counter circuit 705, a logic circuit 710, a burst mode delay circuit 715, a burst mode logic circuit 720, a burst mode counter circuit 725, and an output-enable logic circuit 730. The frame counter circuit 705 may generate a counter value and adjust (e.g., continuously adjust) the counter value in response to each frame provided by the image detector circuit 305 to the readout circuit 310. For example, the frame counter circuit 705 and/or other circuit may monitor for an EOF signal associated with an end of a frame. Upon an EOF signal being detected (e.g., by the frame counter circuit 705 and/or other circuit), the frame counter circuit 705 may adjust the counter value. As one example, the frame counter circuit 705 may adjust a counter value from 0 to 6 by incrementing by 1 for each EOF detected, and then rolling back from 6 to 0 upon detecting an EOF when the counter value is 6. As other examples, rather than incrementing a counter value by one, other manners by which to adjust the counter value may include decrementing by one starting from the maximum counter value and rolling back to the maximum counter value upon decrementing from the minimum counter value, incrementing or decrementing by a predetermined value, or the like.

The logic circuit 710 may generate a control signal $C_{FC\_rst}$ (e.g., frame counter reset signal) to cause the frame counter circuit 705 to reset. In the above example of incrementing from 0 to 6, when the maximum counter value (e.g., 6) has been reached, the logic circuit 710 may generate the control signal $C_{FC\_rst}$ to cause the frame counter circuit 705 to set the counter value back to the minimum counter value (e.g., 0). The logic circuit 710 may generate a control signal $C_{LFR\_en}$ (e.g., a low frame rate enable signal, such as 9 Hz frame enable signal) for each counter value and provide the control signal $C_{LFR\_en}$ to the output-enable logic circuit 730. As an example, for each counter value from 0 to 5, the logic circuit 710 may generate the control signal $C_{LFR\_en}$ having a first state (e.g., logic low state). In image mode, the frame output circuit 325 may generate and output a blank frame in response to the control signal $C_{LFR\_en}$ being in the first state. In an aspect, the blank frame may be an internal signal of the imaging device 300 and not provided as an output that can be stored, displayed, or otherwise provided for user consumption. For a counter value of 6, the logic circuit 710 may generate the control signal $C_{LFR\_en}$ having a second state (e.g., logic high state). In image mode, in response to the control signal $C_{LFR\_en}$ being in the second state, the frame output circuit 325 may provide (e.g., generate and output) an image data frame based on image data of the scene 315 contained in a corresponding frame from the image detector circuit 305. In some cases, the control signal $C_{LFR\_en}$ may be inverted relative to the image enable signal $C_{IMG\_en}$ shown in FIG. 6. As such, the frame counter circuit 705 and the logic circuit 710 operate in tandem to periodically allow an image data frame to be provided by the readout circuit 310, while allowing a blank frame to be provided by the readout circuit 310 during other frame periods.

The burst mode delay circuit 715 may be utilized to implement a minimum delay between adjacent instances of burst mode operation and/or between a power-on of the imaging device 300 and a first instance of burst mode operation. When the minimum delay has elapsed, the burst mode delay circuit 715 may set a control signal $C_{BST\_rdy}$ (e.g., burst mode ready signal) to an asserted state (e.g., logic high). Before the minimum delay has elapsed, the burst mode delay circuit 715 may set the control signal $C_{BST\_rdy}$ to a deasserted state (e.g., logic low). In an aspect, the burst mode delay circuit 715 may be implemented as a timer (e.g., to implement a minimum amount of time that must elapse) and/or a counter (e.g., to implement a minimum number of frame periods that must elapse). As an example, the burst mode delay circuit 715 may include an image data frame counter that has counter values from 0 to 258 (e.g., corresponding to a minimum time of around 30 seconds when image data frames are output at 8.57 Hz). In some cases, the image data frame counter may increment upon detecting an EOF associated with an image data frame. In other cases, the burst mode delay circuit 715 may utilize the state or transition of the state of the control signal $C_{LFR\_en}$ in determining whether to adjust the counter value. For example, a transition of the control signal $C_{LFR\_en}$ from 0 to 1 (e.g., indicating an image data frame is to be provided by the frame output circuit 325) may cause the burst mode delay circuit 715 to increment its counter value. In an aspect, once the minimum delay has elapsed, the burst mode delay circuit 715 may remain at the same value until an instance of burst mode operation is complete. For the above example, the burst mode delay circuit 715 may have a counter value remaining at 258 to indicate that the minimum delay of 259 image data frame periods has elapsed. As another example, the burst mode delay circuit 715 may have a timer remaining at 30 seconds to indicate that the minimum delay of 30 seconds has elapsed or, equivalently, a timer remaining at 0 seconds to indicate that 0 seconds remain of the minimum delay.

The burst mode logic circuit 720 may cause the readout circuit 310 to transition from image mode operation to burst mode operation when the control signal $C_{BST\_rdy}$ from the burst mode delay circuit 715 is in an asserted state and a command signal $C_{burst}$ is in an asserted state (e.g., placed in a logic high based on user input). In an aspect, the burst mode logic circuit 720 may implement a random or pseudorandom delay before transitioning from image mode to burst mode. In some cases, if the command signal $C_{burst}$ is asserted while the control signal $C_{BST\_rdy}$ is deasserted (e.g., the minimum delay has not elapsed), the command signal $C_{burst}$ may be ignored.

In burst mode, the burst mode counter circuit 725 may generate a control signal $C_{BST\_en}$ (e.g., burst mode enable signal) for the output-enable logic circuit 730 and keep track of a number of image data frames that have been provided at the first frame rate (e.g., 60 Hz) by the frame output circuit 325. The burst mode counter circuit 725 may increment its counter value once for each frame period (e.g., 16 ms). In some cases, the burst mode counter circuit 725 may increment in response to each detected EOF. The control signal $C_{BST\_en}$ may remain in the asserted state for the duration of burst mode operation. In an aspect, in burst mode operation, the frame counter circuit 705 continuously adjusts its counter value in response to each detected EOF of the image data frames containing calibration data (e.g., image data of the shutter 335 captured by the image detector circuit 305). In some cases, the burst mode counter circuit 725 may adjust its counter value in tandem with adjustments to the counter value of the frame counter circuit 705.

After an instance of burst mode operation is completed (e.g., fifteen consecutive image data frames output at the first frame rate of 60 Hz), the burst mode counter circuit 725 may reset its counter value to zero and generate a control signal $C_{BST\_rst}$ (e.g., burst reset signal) to cause the burst mode logic circuit 720 to deassert the command signal $C_{burst}$. In addition, the burst mode logic circuit 720 may generate a control signal $C_{delay\_rst}$ (e.g., delay reset signal) to deassert the control signal $C_{BST\_rdy}$ and cause the burst mode delay circuit 715 to implement the minimum delay such that at least the minimum delay elapses before a next instance of burst mode operation can be initiated. In this regard, as an example, the burst mode logic circuit 720 may reset its counter value back to zero and start counting the next 259 image data frames as they arrive at the output logic circuit 320 (e.g., by counting detected EOFs). In some cases, after an instance of burst mode operation, the counter value of the frame counter circuit 705 may also be reset.

The output-enable logic circuit 730 may generate a control signal $C_{OUT\_en}$ (e.g., output enable) based on a state of the control signals $C_{LFR\_en}$ and $C_{BST\_en}$ to cause the frame output circuit 325 to provide a blank frame or an image data frame. In an aspect, the control signal $C_{OUT\_en}$ may be in an asserted state (e.g., logic high) to cause the frame output circuit 325 to output an image data frame and in a deasserted state (e.g., logic low) to cause the frame output circuit 325 to output a blank frame. The control signal $C_{OUT\_en}$ may be in the asserted state when one or both of the control signals $C_{LFR\_en}$ and $C_{BST\_en}$ are in the asserted state. In this regard, for example, in image mode, the control signal $C_{LFR\_en}$ may be in an asserted state every seventh frame captured by the image detector circuit 305 and in a deasserted state for the six frames between every seventh frame. In burst mode, the control signal $C_{BST\_en}$ may be in an asserted state for fifteen consecutive frames. During these consecutive frames, the control signal $C_{SH}$ may also be in an asserted state to cause the shutter 335 to block the image detector circuit 305.

In some implementations, counter values and/or timer values (e.g., for the frame counter circuit 705 and the burst mode delay circuit 715) may be reset in response to a global master reset from a user's command word. As an example, the global master reset may be associated with a shutdown and/or a power-on of the imaging device 300 (e.g., at least a portion of the imaging device 300 associated with operation of the image detector circuit 305 and the readout circuit 310). Such a global master reset facilitates implementing of a minimum delay before burst mode is ready and a minimum number of blank frames before a first image data frame can be output after powering on the imaging device 300. In this regard, upon powering on the imaging device 300 (e.g., portion of the imaging device 300 associated with operation of the image detector circuit 305 and the readout circuit 310), at least a minimum delay needs to elapse before a first instance of burst mode operation and a minimum number of blank frames needs to be output since power-on can be initiated. Similarly, counter values and/or timer values are reset upon powering on and/or shutting down the imaging device 300, such that a minimum number of blank frames that needs to be provided (e.g., output, transmitted) by the readout circuit 310 before the readout circuit 310 can provide an image data frame cannot be decreased.

In an aspect, even if the user were to interrupt the burst of frames during burst mode operation, such as with an early $F_{SYNC}$ signal, the readout circuit 310 may be configured to stop providing data until a full frame time has been completed. For example, when the image detector circuit 305 has 512×512 pixels, a full frame time is the amount of time to read out all 512 rows of pixels.

Figure 8:
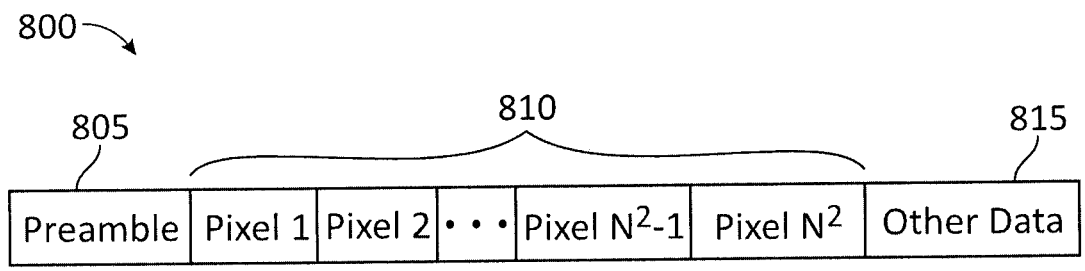
FIG. 8 illustrates an example frame in accordance with one or more embodiments of the present disclosure.

FIG. 8 illustrates an example frame 800 in accordance with one or more embodiments of the present disclosure. It is noted that the frame 800 is provided by way of non-limiting example and may include more, fewer, and/or different fields from that shown in FIG. 8. The frame 800 may be an image data frame or a blank frame. For explanatory purposes, the image detector circuit 305 may capture image data of the scene 315 (e.g., during image mode operation) or the shutter 335 (e.g., during burst mode operation) and the readout circuit 310 may generate the frame 800. The image detector circuit 305 may have $N^2$ detectors (e.g., N×N array of detectors), such as 65,536 detectors (e.g., 256×256 array of detectors).

The frame 800 includes a preamble 805, fields 810 for data associated with the detectors of is the image detector circuit 305, and a field 815 for other data. The fields 810 include a Pixel 1 field, Pixel 2 field, Pixel $N^2$ field, and so forth, for data associated with a first detector, second detector, and $(N^2)^{th}$ detector of the image detector circuit 305, respectively, and so forth. For an image data frame, each of the Pixel 1 field, Pixel 2 field, Pixel $N^2$ field, and so forth, include image data of the scene 315 (e.g., during image mode operation) or the shutter 335 (e.g., during burst mode operation) captured by the first detector, second detector, and $(N^2)^{th}$ detector, respectively, and so forth. For a blank frame, the readout circuit 310 does not include image data captured by the image detector circuit 305 in the fields 810 or anywhere else in the frame 800. The field 815 may include a temperature of an imaging system (e.g., 100) that includes the image detector circuit 305 and the readout circuit 310 and/or generally any signals generated by and/or utilized by the imaging system. In an aspect, for blank frames, the control signal $C_{OUT\_en}$ may be at logic low for the fields 810 but at logic high for the field 815 to cause blank out of image data while allowing the other data of the field 815 to be provided by the frame output circuit 325. As one non-limiting example, the Pixel 1 field, Pixel 2 field, Pixel $N^2$ field, and so forth may each be associated with a duration of thirteen system clock ticks.

Figure 9:
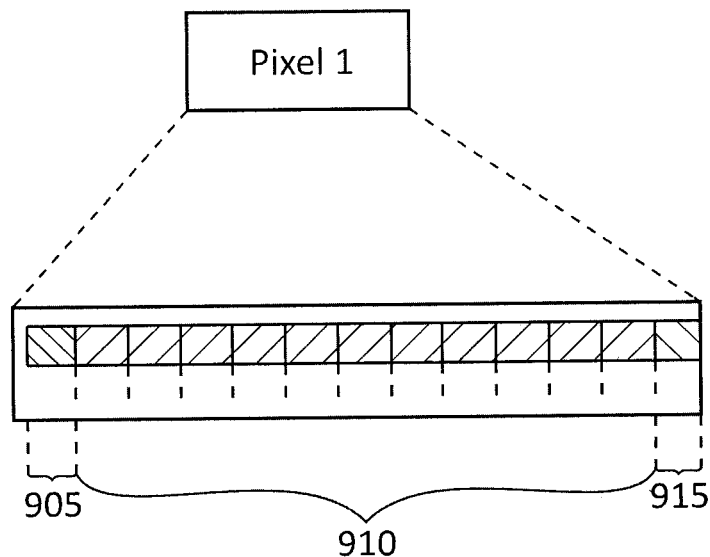
FIG. 9 illustrates an example image data field for the frame of FIG. 8 in the case that the frame is a pixel data frame, in accordance with one or more embodiments of the present disclosure.
Figure 10:
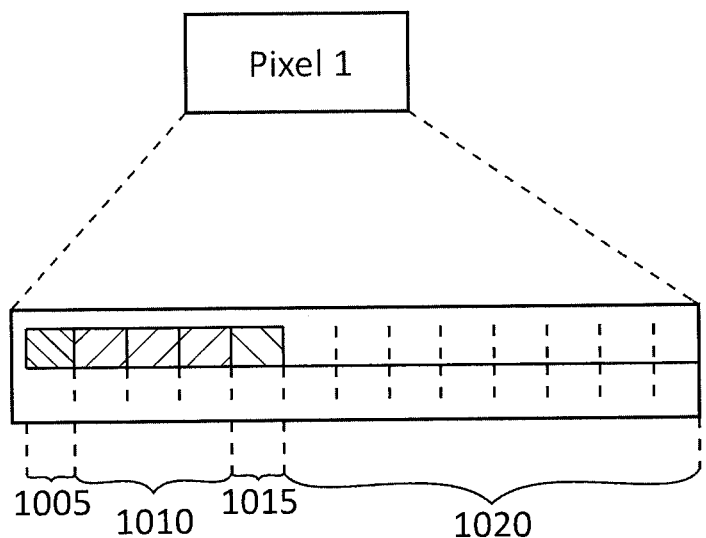
FIG. 10 illustrates an example image data field for the frame of FIG. 8 in the case that the frame is a blank frame, in accordance with one or more embodiments of the present disclosure.

FIGS. 9 and 10 illustrate an example Pixel 1 field for the frame 800 of FIG. 8 in the case that the frame 800 is a pixel data frame or a blank frame, respectively, in accordance with one or more embodiments of the present disclosure. In FIG. 9, the Pixel 1 field includes a bit 905 to indicate that the frame 800 is an image data frame, bits 910 that represent image data captured by the first detector or data indicative of the image data, and a bit 915 to indicate whether or not burst mode is ready. The bit 905 may be the least significant bit of the Pixel 1 field. Similarly, the Pixel 2 field, Pixel $(N^2-1)^{th}$ field, Pixel $(N^2)^{th}$ field, and so forth, include a similar format as the Pixel 1 field, with each of these fields having bits that represent image data or data indicative of such image data captured by a respective detector.

In FIG. 10, the Pixel 1 field includes a bit 1005 to indicate that the frame 800 is a blank frame, bits 1010 indicating a number of blank frames remaining before a next image data frame (e.g., or, equivalently, a number of blank frames since a previous image data frame), and a bit 1015 to indicate whether burst mode is ready. The bit 1005 may be the least significant bit of the Pixel 1 field. As an example, the bits 1010 may include three bits (e.g., to accommodate the case that there are six blank frames between two image data frames). A portion 1020 may be associated with a number of clock ticks before a start of the Pixel 2 field that follows the Pixel 2 field. The portion 1020 may include padding bits or no bits. In some cases, a number of clock ticks (e.g., the length) associated with the Pixel 1 field for a blank frame may be the same as a number of clock ticks associated with the Pixel 1 field for an image data frame. In this regard, more generally, the frame 800 may be associated with the same number of clock ticks regardless of whether the frame 800 is a blank frame or an image data frame, such as to facilitate timing of operations by the readout circuit 310 and/or component(s) downstream of the readout circuit 310 that receive the frame(s) from the readout circuit 310. For a blank frame, image data of the scene 315 captured by the first detector of the image detector circuit 305 is not included in the Pixel 1 field or any other field of the frame 800. In the example of FIG. 10, the Pixel 2 field, Pixel $(N^2-1)$ field, Pixel $N^2$ field, and all other fields in between may contain the same data as the Pixel 1 field. In other implementations, the Pixel 1 field, Pixel 2 field, Pixel $N^2$ field, etc. may contain different data from each other, so long as no part of the frame 800 is based on pixel data captured by the image detector circuit 305.

As an example, the bit 905 of FIG. 9 may be a logic low (e.g., 0) to indicate the frame 800 is an image data frame and the bit 1005 of FIG. 10 may be a logic high (e.g., 1) to indicate the frame 800 is a blank frame, or vice versa. The bits 915 and 1015 may be in the same state as the burst mode ready signal (e.g., $C_{BST\_rdy}$). The bits 915 and 1015 may be a logic low when $C_{BST\_rdy}$ is at logic low (e.g., burst mode cannot be initiated) and a logic high when $C_{BST\_rdy}$ is at logic high (e.g., burst mode can be initiated).

In some aspects, the bit 915 in the pixel data frames is utilized for the image data captured by the first detector or data indicative of the image data. The bit 1015 in the blank frames is utilized to indicate whether or not burst mode is ready. In these aspects, in FIG. 9, the bits 910 and 915 may collectively provide 12 bits to represent the image data or data indicative of the image data, rather than 11 bits in the case that the bit 915 is utilized to indicate whether burst mode is ready. As such, these aspects allow more image data to be provided in the image data frames.

Although the foregoing describes performing calibration operations in the burst mode to allow image data frames that include image data of the shutter 335 to be output at a higher frame rate (e.g., 60 Hz), in some embodiments calibration operations may be performed in image mode at a lower frame rate (e.g., 9 Hz). For example, the user of the imaging system may provide a command to cause calibration operations to be performed in image mode, rather than waiting for burst mode to be ready. In some aspects, one or more additional timers and/or counters may be utilized to track an amount of time since a previous calibration operation (e.g., FFC event). For example, when a predetermined amount of time has elapsed (e.g., as tracked by the timer(s) and/or counter(s)) since a previous FFC event, the imaging system may suggest to the user (e.g., by displaying a message on a display device) to perform an FFC event and/or the imaging system may proceed to perform an FFC event without user input. The imaging system may perform the FFC event in image mode (e.g., using 9 Hz frames) or, if burst mode is ready, in burst mode (e.g., using 60 Hz frames). In some cases, the user may define settings of the imaging system to indicate whether the imaging system may automatically perform the FFC event and, if so, whether the imaging system can automatically perform the FFC event in image mode or, if ready, in burst mode.

Figure 11:
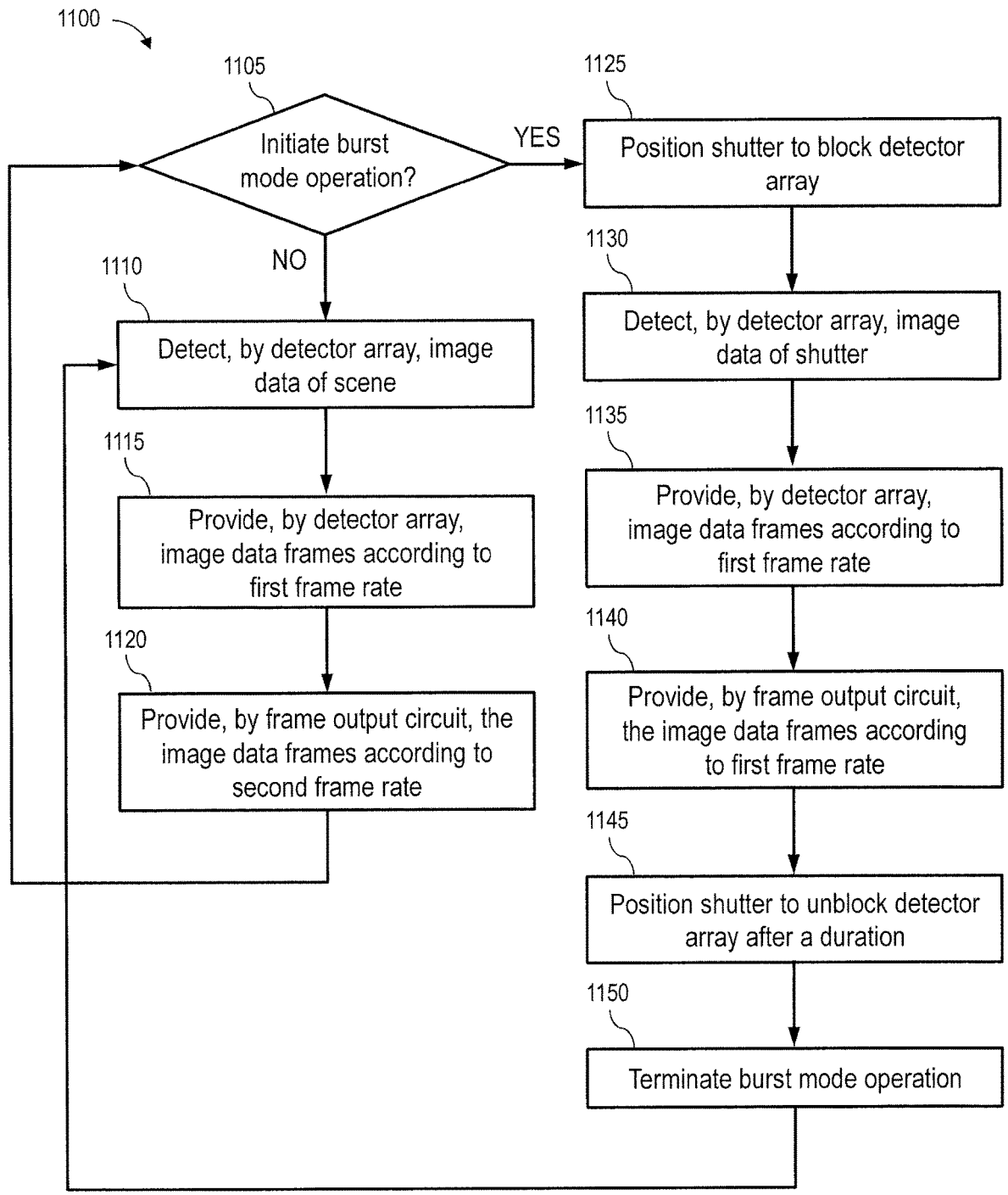
FIG. 11 illustrates a flow diagram of an example process for facilitating burst mode calibration sensing and image mode sensing in accordance with one or more embodiments of the present disclosure.

FIG. 11 illustrates a flow diagram of an example process 1100 for facilitating burst mode calibration sensing and image mode sensing in accordance with one or more embodiments of the present disclosure. For explanatory purposes, the example process 1100 is primarily described herein with reference to components of FIGS. 3 and 7; however, the example process 1100 is not limited to components of FIGS. 3 and 7. The blocks of example process 1100 are described herein as occurring in serial, or linearly (e.g., one after another). However, multiple blocks of example process 1100 may occur in parallel. In addition, the blocks of example process 1100 need not be performed in the order shown and/or one or more of the blocks of example process 1100 need not be performed.

At block 1105, a determination is made as to whether burst mode operation is to be initiated. In an aspect, the determination may be made by the burst mode logic circuit 720. The burst mode logic circuit 720 may determine that burst mode is to be initiated when the control signal $C_{BST\_rdy}$ from the burst mode delay circuit 715 and the command signal $C_{burst}$ (e.g., based on user input) are in an asserted state. For example, the control signal $C_{BST\_rdy}$ may be in the asserted state when a minimum delay has elapsed since power-on or since a previous instance of burst mode operation. The burst mode logic circuit 720 may determine that burst mode is not to be initiated when the control signal $C_{BST\_rdy}$ or the command signal $C_{burst}$, or both, is in a deasserted state.

If the determination is that burst mode operation is not to be initiated, the process 1100 proceeds to block 1110. At block 1110, the image detector circuit 305 (e.g., detector array) detects image data of the scene 315 (e.g., in the form of EM radiation). At block 1115, the image detector circuit 305 provides image data frames to the readout circuit 310 according to the first frame rate (e.g., 60 Hz or other desired frame rate). The image data frames include image data of the scene 315. At block 1120, the frame output circuit 325 of the readout circuit 310 provides the image data frames according to the second frame rate lower than the first frame rate (e.g., around 9 Hz or other desired lower frame rate). In some cases, to provide these image data frames, the frame output circuit 325 may generate image data frames that include the image data frames (e.g., encapsulate the image data frames) from the image detector circuit 305 and/or include data indicative of the image data contained in the image data frames from the image detector circuit 305. The image data frames may be provided to components downstream of the readout circuit 310. The process 1100 then proceeds to block 1105, in which a determination is made as to whether burst mode is to be initiated.

If the determination is that burst mode operation is to be initiated, the process proceeds to block 1125. At block 1125, the shutter 335 is positioned to block the image detector circuit 305 as part of initiating burst mode. In an aspect, the burst mode logic circuit 720 may cause the readout circuit 310 to transition from image mode to burst mode. The control signal $C_{SH}$ may be asserted to cause the shutter 335 to be positioned to block the image detector circuit 305. In one example, the control signal $C_{SH}$ may be provided to an actuator that moves the shutter 335 to position the shutter 335 to block the image detector circuit 305. The control signal $C_{SH}$ may be provided by the burst mode logic circuit 720 and/or other control circuitry.

At block 1130, the image detector circuit 305 detects image data of the shutter 335. At block 1135, the image detector circuit 305 provides image data frames to the readout circuit 310 according to the first frame rate. The image data frames include image data of the shutter 335. At block 1135, the frame output circuit 325 provides the image data frames according to the first frame rate. In some cases, to provide these image data frames, the frame output circuit 325 may generate image data frames that include the image data frames (e.g., encapsulate the image data frames) from the image detector circuit 305 and/or include data indicative of the image data contained in the image data frames from the image detector circuit 305. The image data frames may be provided to components downstream of the readout circuit 310.

At block 1145, after a duration, the shutter 335 is positioned to unblock the image detector circuit 305. The duration is an amount of time or a number of frame periods that the readout circuit 310 can operate in one instance of burst mode operation (e.g., provide consecutive image data frames according to the first frame rate). In this regard, the duration may be provided in terms of an amount of time (e.g., 0.25 seconds) or a number of frame periods (e.g., 15 frame periods), and may be tracked using a timer and/or a frame counter (e.g., image data frame counter). At block 1150, burst mode operation is terminated. Termination of burst mode operation may include resetting any timers, counters, and/or other circuitry such that the readout circuit 310 transitions to image mode operation and that at least minimum delay is needed to elapse before a next instance of burst mode operation can be initiated. In addition, by resetting an associated counter, a number of blank frames may be provided by the frame output circuit prior to a first image data frame being provided by the frame output circuit after termination of burst mode operation. It is noted that block 1145 may be considered part of block 1150. The process 1100 then proceeds to block 1110, in which the image detector circuit 305 detects image data of the scene 315 (e.g., the image detector circuit 305 is not blocked by the shutter 335).

Figure 12:
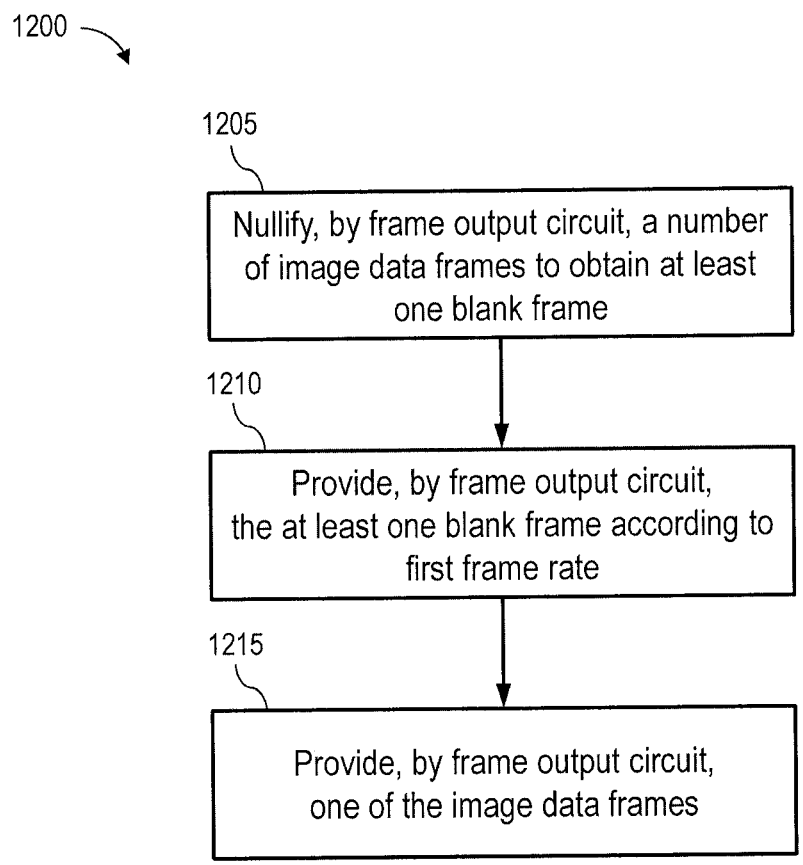
FIG. 12 illustrates a flow diagram of an example process for providing image data frames at the second frame rate in accordance with one or more embodiments of the present disclosure.

FIG. 12 illustrates a flow diagram of an example process 1200 for providing image data frames at the second frame rate in accordance with one or more embodiments of the present disclosure. For explanatory purposes, the example process 1200 is primarily described herein with reference to components of FIGS. 3 and 7; however, the example process 1200 is not limited to components of FIGS. 3 and 7. The blocks of example process 1200 are described herein as occurring in serial, or linearly (e.g., one after another). However, multiple blocks of example process 1200 may occur in parallel. In addition, the blocks of example process 1200 need not be performed in the order shown and/or one or more of the blocks of example process 1200 need not be performed. In some aspects, the example process 1200 may provide an example manner in which to perform block 1120 of FIG. 11.

At block 1205, the frame output circuit 325 of the readout circuit 310 nullifies a number of the image data frames from the image detector circuit 305 to obtain a number of blank frames. In some cases, to obtain the blank frame(s), the frame output circuit 325 may remove the image data contained in the image data frames from the image detector circuit 305, and/or may generate frames (e.g., default frames) that are independent of the image data contained in the image data frames from the image detector circuit 305. At block 1210, the frame output circuit 325 provides the blank frame(s) according to the first frame rate. At block 1215, the frame output circuit 325 provides one of the image data frames from the image detector circuit 305 (e.g., without blanking out the image data). Blocks 1205, 1210, and 1215 may be repeated for the image data frames from the image detector circuit 305 during image mode operation of the readout circuit 310. By performing blocks 1205, 1210, and 1215 during image mode operation, the readout circuit 310 may maintain an output frame rate at the first frame rate by providing image data frames at the second frame rate with one or more blank frames interspersed between two image data frames. The frame output circuit 325 may provide the blank frame(s) and the image data frame to components downstream of the readout circuit 310. In an aspect, the frame output circuit 325 may determine whether or not to blank out an image data frame from the image detector circuit 305 based on the control signal $C_{OUT\_en}$ from the output logic circuit 320.

As an example, with reference to FIG. 4, at block 1205, the frame output circuit 325 may nullify the six image data frames associated with frame numbers 7 to 12 from the image detector circuit 305 to obtain six blank frames. At block 1210, the frame output circuit 325 may provide the six blank frames according to the first frame rate. At block 1215, the frame output circuit 325 may provide the image data frame associated with frame number 13 from the image detector circuit 305 (e.g., without blanking out the image data frame from the image detector circuit 305).

In an aspect, with the image detector circuit 305 providing image data frames at a frame rate of 60 Hz, the readout circuit 310 providing image data frames at a frame rate of around 8.57 Hz in image mode and fifteen consecutive image data frames at 60 Hz in burst mode, an average image data frame rate of the readout circuit 310 is around 9 Hz. It is noted that such frame rates and average frame rates are provided by way of non-limiting examples. For instance, the readout circuit 310 may be configured to output fewer or more than fifteen consecutive frames at the first frame rate during burst mode operation. More generally, a frame rate associated with the image detector circuit 305 and/or readout circuit 310, frame rates associated with image mode operation and burst mode operation, an appropriate number of frames utilized for calibration, among others, are generally application specific.

Furthermore, in some embodiments, to minimize cost and calibration/production complexity, a single imager design (e.g., design of an FPA including an image detector circuit and a readout circuit) may be used for products (e.g., cameras) having different frame rates while preventing users from tampering with a lower frame rate product to obtain data at a higher frame rate. In an embodiment, the imager may be provided with a one-time-programmable memory. Prior to programming the one-time-programmable memory, the imager may be set to operate at a higher frame rate, with image data frames continuously output at the higher frame rate.

Before leaving the factory, the imager can be converted to a lower frame rate by programming the one-time-programmable memory (e.g., by selectively setting the fuse(s)) in an irreversible configuration process. In an embodiment, the one-time programmable memory may be provided in a readout circuit. For explanatory purposes, the one time-programmable memory may be implemented using one or more fuses, although other types of one time-programmable memory may be utilized. Each fuse may be programmed (e.g., set, blown) by applying an electrical signal (e.g., voltage, current), applying a laser, and/or other fuse-setting technique as appropriate based on technology utilized to implement the fuse. In a case with multiple fuses, the fuses of the imager may be of the same type or may be of two or more different types (e.g., based on costs, application, etc.). For example, a fuse may be implemented as a trace that can be programmed (e.g., set, blown) by using a laser to cut the trace. An example implementation of a fuse is described with respect to FIG. 15.

Upon programming the one-time programmable memory, the imager may be referred to as being in a programmed state. When the imager is in the programmed state, the readout circuit of the imager may mask data for N out of M frames, thereby limiting a frame rate at which image data frames are output. The readout circuit is permanently switched to providing image data frames at a lower frame rate during image mode operation, while allowing for the higher frame rate during burst mode operation. For example, if six out of seven frames are masked, then one out of seven frames is an image data frame and the image data frame rate (e.g., frame rate for frames containing image data) is cut to one-seventh of the original high frame rate. The image data frame rate may also be referred to as an effective frame rate of the readout circuit. In programming the one-time programmable memory (e.g., by the manufacturer), the imager is changed to a new configuration and cannot be reverted back by a user. In some cases, the readout circuit (e.g., with fuses embedded therein) is located under a wafer-scale package vacuum, and thus is essentially impossible to access or modify without destroying the vacuum needed for the image detector circuit (e.g., microbolometers) imaging a scene.

In an aspect, in a case that the imager includes microbolometers, inputs may remain the same such that image data is still collected by the microbolometers at the higher frame rate and the microbolometers are still biased at the higher frame rate even when the readout circuit is outputting image data frames at the lower frame rate. The imager heating (e.g., pulse-biased heating) of the microbolometers remains the same and calibration terms captured prior to programming the one-time-programmable memory may continue to be used. Such calibration terms may be adjusted as appropriate by performing calibration operations (e.g., FFC events) after programming the one-time-programmable memory. Since the inputs may remain unchanged, electronics (e.g., processing circuits, etc.) of imager may remain unchanged despite the change in output image data frame rate of the readout circuit. In some cases, the electronics may be utilized to identify when blank frames are being sent by the imager and continue to display a last image data frame until a next image data frame is output by the readout circuit. In some cases, a flag may be set in the blank frames indicating that the frames are blanked out (e.g., contain no image data) to facilitate identification of the blank frames. For example, the bits 905 and 1005 of FIGS. 9 and 10, respectively, may implement the flag.

In some aspects, extra steps may be taken to prevent accidental programming of the one-time-programmable memory. For explanatory purposes, the one-time-programmable memory includes one or more fuses. Accidental programming of the fuses may result in the imager with the readout circuit configured to provide image data frames at a high frame rate (e.g., 30 Hz, 40 Hz, 60 Hz) to one that inadvertently gets locked to a lower frame rate (e.g., less than 10 Hz). As an example, a fuse(s) may be implemented such that a two-step procedure is utilized to program the fuse(s). In an example two-step procedure, to program a given fuse, a pad may need to be at a certain voltage (e.g., greater than 1.8 V) when an electrical command to program the fuse is sent to the imager. In the field, all imaging systems may have this pad tied to ground to guard against electrical glitches accidentally commanding the fuses to be programmed (e.g., set, blown). To further reduce changes of accidentally changing the frame rate in the field, a lower frame rate may be activated only after a multiple number of fuses and/or a certain combination of fuses are blown (e.g., states of the fuses are tied together using AND gates, OR gates, etc.). For instance, if states associated with three fuses are tied together using an AND gate, all three fuses must be accidentally blown (e.g., generally a negligible probability) to transition the imager from the non-programmed state to the programmed state.

Figure 13:
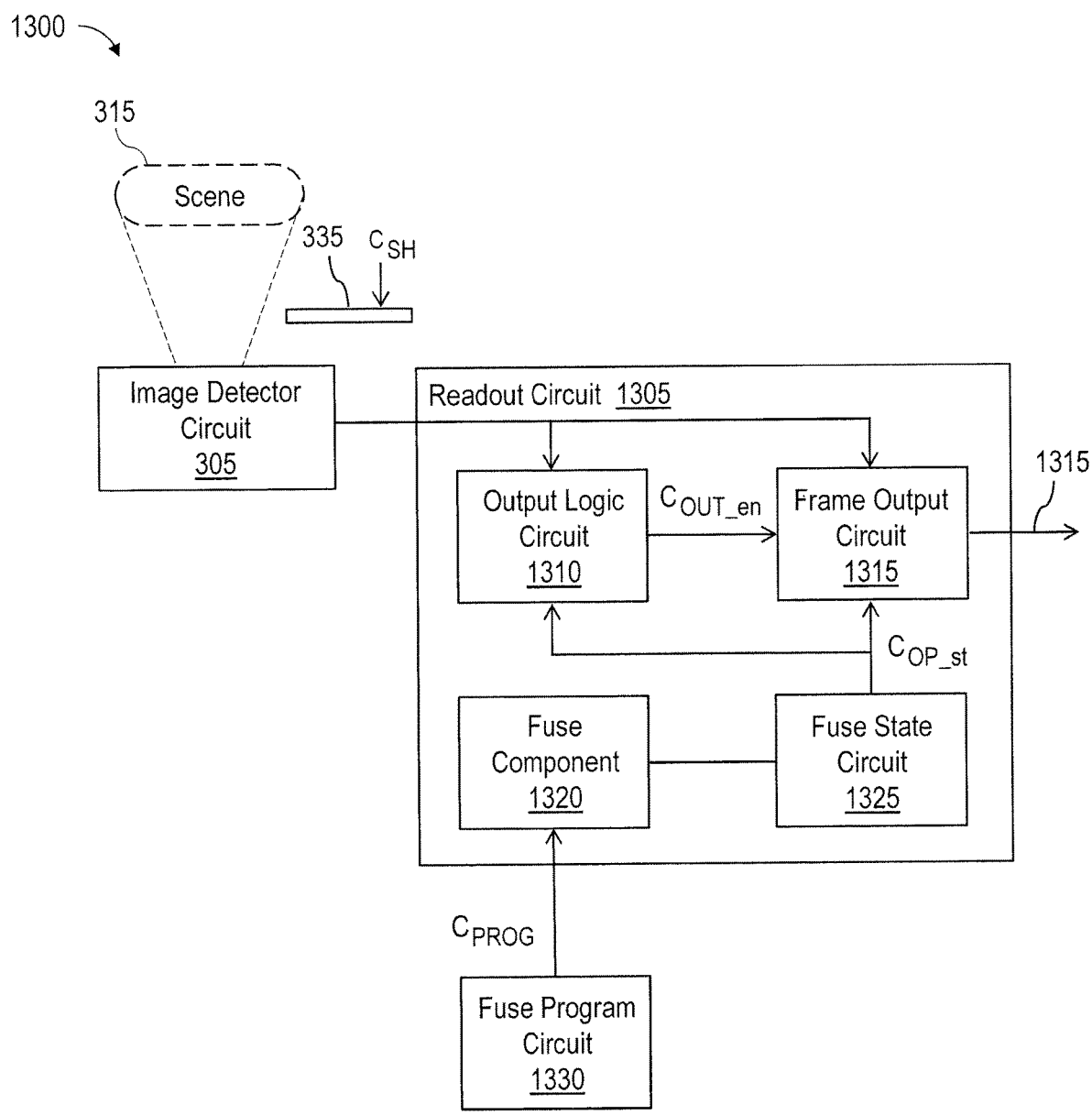
FIG. 13 illustrates an example imaging device in accordance with one or more embodiments of the present disclosure.

FIG. 13 illustrates an example imaging device 1300 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the imaging device 1300 may be a part of the imaging system 100 of FIG. 1. For example, the imaging device 300 may be, may include, or may be a part of, the imaging device 105 of FIG. 1. The description from FIG. 3 generally applies to FIG. 13, with examples of differences between FIG. 3 and FIG. 13 and other description provided herein.

The imaging device 1300 includes the image detector circuit 305 and a readout circuit 1305. The image detector circuit 305 may include an array of detectors (e.g., array of microbolometers) to detect EM radiation associated with the scene 315, generate frames containing pixel values, and output the frames according to a first frame rate (e.g., 60 Hz). The readout circuit 1305 includes an output logic circuit 1310, a frame output circuit 1315, a fuse component 1320, and a fuse state circuit 1325. In an embodiment, the description of the output logic circuit 320 and the frame output circuit 325 generally applies to the output logic circuit 1310 and the frame output circuit 1315, respectively.

The fuse component 1320 includes one or more fuses to facilitate defining whether the imaging device 1300 is in a non-programmed state or a programmed state. In the non-programmed state, the readout circuit 1305 may provide image data frames at a higher frame rate (e.g., 60 Hz). In the programmed state, the readout circuit 310 may provide image data frames at a lower frame rate (e.g., around 9 Hz) in image mode and at the higher frame rate for calibration purposes in burst mode. In some cases, the fuse component 1320 may include multiple fuses divided among multiple fuse banks. Each fuse of the fuse component 1320 may be in a programmed state (e.g., also referred to as a blown state) or a non-programmed state (e.g., also referred to as an unblown state). Although the fuse component 1320 is described with reference to fuse(s) that are blown to facilitate and burst mode operation, the fuse component 1320 may include one or more other fuses related to other operations of the readout circuit 1305 and/or other circuitry that are unrelated to facilitating image mode and burst mode operation. In addition, while the imaging device 1300 includes the fuse component 1320, in other embodiments other types of one-time programmable memory may be utilized alternative to or in addition to one or more fuse(s).

The fuse state circuit 1325 may determine a state of the fuse component 1320 (e.g., a state of each fuse of the fuse component 1320), generate the control signal $C_{OP\_st}$ based on the state, and provide the control signal $C_{OP\_st}$ to the output logic circuit 1310 and the frame output circuit 1315 to cause operation of the output logic circuit 1310 and the frame output circuit 1315 according to the state of the fuse component 1320. In an aspect, the fuse state circuit 1325 may determine a state of each fuse of the fuse component 1320 upon powering up the imaging device 1300 and for every frame of the image detector circuit 305 that is read out by the readout circuit 1305. As examples, the fuse(s) may be polysilicon fuse(s) and/or metal fuse(s). In an aspect, fuses may be blown by setting a voltage across the fuse that results in significant current flow through low resistance fuses. This current causes electromigration to occur that eventually changes the resistance of the fuse significantly, resulting in a much higher resistance or even an open circuit. A state of a fuse can then be determined by applying a small amount of current through the fuse to determine if the fuse has a high resistance (e.g., fuse has been blown) or low resistance (e.g., fuse has not been blown).

In an embodiment, when an appropriate set of one or more fuses of the fuse component 1320 are determined by the fuse state circuit 1325 to have been programmed (e.g., blown), the imaging device 1300 transitions from the non-programmed state to the programmed state. As such, the readout circuit 1305 operates in image mode to provide image data frames at a lower frame rate (e.g., 9 Hz) with blank frames between such image data frames and operates in burst mode to provide image data frames (e.g., containing calibration data) at a higher frame rate (e.g., 60 Hz). When the appropriate set of one or more fuses are determined by the fuse state circuit 1325 to not have been programmed, the imaging device 1300 remains in the non-programmed state, in which the readout circuit 1305 can be operated to provide image data frames at the higher frame rate at all times. In the non-programmed state, components of the output logic circuit 1310 and/or the frame output circuit 1315 related, for example, to counting frames and blanking out frames may be powered off or in a low power state (e.g., standby state). For example, the control signal $C_{OUT\_en}$ may continuously be set to a logic high state during operation of the readout circuit 1305 to allow providing of image data frames at the higher frame rate frame after frame. In this regard, operation of various counters, logic circuits, and processors of the output logic circuit 1310 and/or the frame output circuit 1315 is unnecessary when the imaging device 1300 is allowed to provide image data frames at the higher frame rate without needing to output any blank frames.

The fuse program circuit 1330 may generate a control signal $C_{PROG}$ to the readout circuit 1305 (e.g., the fuse component 1320) to cause programming of the fuse component 1320. The control signal $C_{PROG}$ indicates the one or more fuses of the fuse component 1320 to program. In some cases, to program the fuse(s), one or more voltages may be applied to a corresponding one or more pads to blow the fuse(s). In an aspect, for a given fuse, to help prevent the fuse from accidentally being blown, the fuse may be blown only when the control signal $C_{PROG}$ indicates the fuse is to be blown and one or more predetermined pads associated with the fuse are set at a certain voltage (e.g., logic high voltage such as 1.8 V in certain implementations). When either the control signal $C_{PROG}$ does not indicate the fuse is to be blown or the pad(s) are not set at the certain voltage, the fuse is not blown. Alternatively or in addition, to prevent blown fuses from causing unintended operation of the imaging device 1300, a predetermined combination of fuses may need to be blown to cause the imaging device 1300 to transition from the non-programmed state to the programmed state. Voltages to be applied to the predetermined pad(s) and/or to blow the fuse(s) may be provided by a power supply in the fuse program circuit 1330, the fuse component 1320, or other circuit electrically coupled to the fuse component 1320.

As an example, in some embodiments, the imaging device 1300 may be manufactured and calibrated for operation of the image detector circuit 305 and the readout circuit 1305 at a certain frame rate, such as 60 Hz. For example, when the frame rate is 60 Hz, the image detector circuit 305 may provide frames at 60 Hz to the readout circuit 1305 and the readout circuit 1305 may output frames at 60 Hz. During this calibration phase, the imaging device 1300 is operating in the non-programmed state (e.g., the fuse(s) of the fuse component 1320 are in the non-programmed state). The calibration phase may be utilized to generate FFC correction terms for the imaging device 1300. After the calibration phase, an appropriate fuse(s) of the fuse component 1320 are programmed (e.g., blown) to transition the imaging device 1300 to the programmed state. For example, an appropriate fuse(s) may be blown right before final shipping of the imaging device 1300 (e.g., to a customer). The imaging device 1300 are generally also tested after the appropriate fuse(s) are blown right before final shipping. In this regard, the imaging device 1300 is calibrated at the higher frame rate (e.g., 60 Hz) associated with the non-programmed state. After the imaging device 1300 is in the programmed state, the FFC correction terms may be adjusted using FFC events (e.g., performing during burst mode operation).

Figure 14:
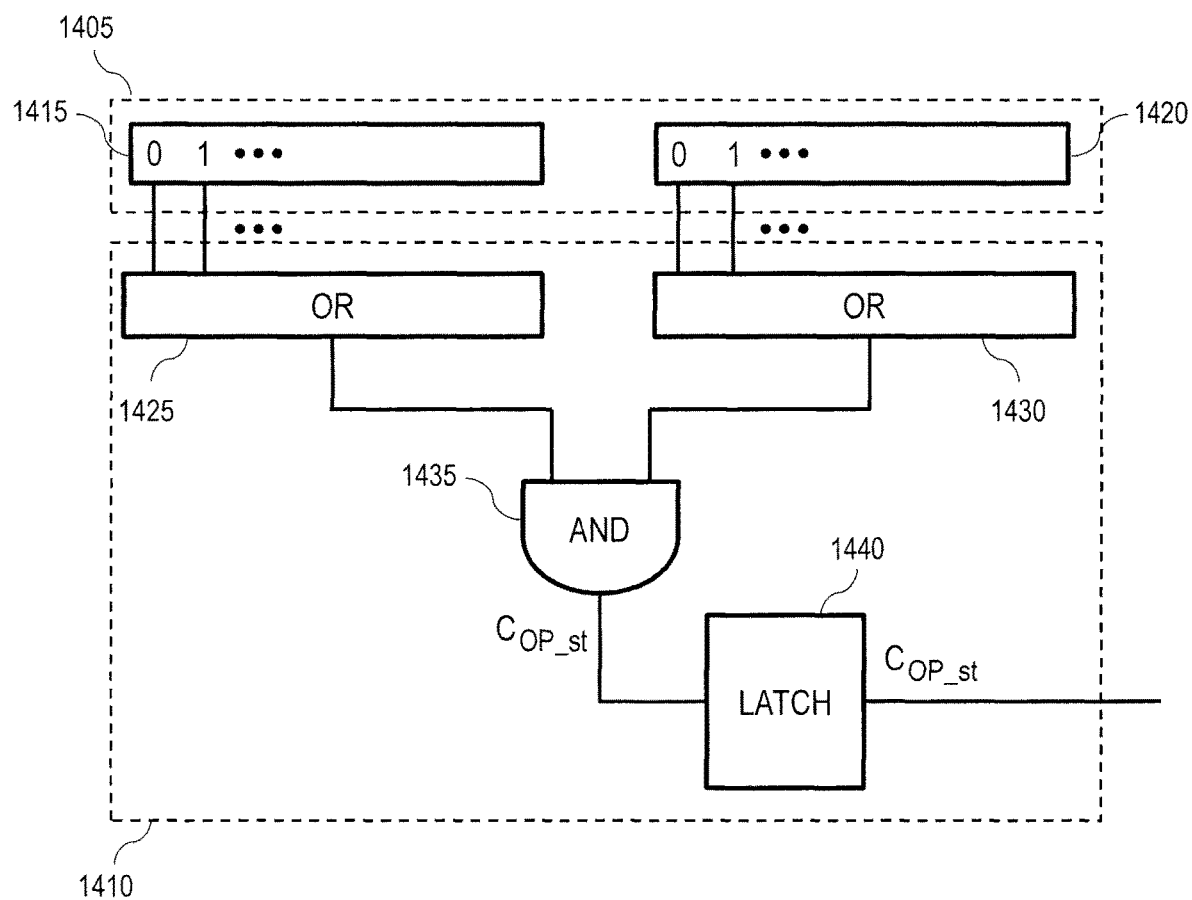
FIG. 14 illustrates an example fuse component and an example fuse state circuit in accordance with one or more embodiments of the present disclosure.

A fuse component may include a single fuse or multiple fuses. As an example involving multiple fuses, FIG. 14 illustrates an example fuse component 1405 and an example fuse state circuit 1410 in accordance with one or more embodiments of the present disclosure. For explanatory purposes, the fuse component 1405 and the fuse state circuit 1410 implemented the fuse component 1320 and the fuse state circuit 1325, respectively, of FIG. 13. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. For example, the fuse component 1405 and/or the fuse state circuit 1410 may include power supplies, sensors, and/or processing components not shown in FIG. 14.

The fuse component 1405 includes a fuse bank 1415 including one or more fuses and a fuse bank 1420 including one or more fuses. Ellipses in each of the fuse banks 1415 and 1420 indicate that the fuse banks 1415 and/or 1420 may include one or more fuses or no fuses in addition to those shown in FIG. 14. The fuse state circuit 1410 includes OR gates 1425 and 1430, an AND gate 1435, and a latch 1440. The fuse state circuit 1410 may determine a state of each of the fuses of the fuse component 1405 upon powering up the imaging device 1300 and for every frame of the image detector circuit 305 that is read out by the readout circuit 1305. For example, the fuse state circuit 1410 may utilize sensors (not shown in FIG. 14) to determine an electrical signal (e.g., resistance, voltage, current) associated with the fuses to determine a state for each of the fuses. In FIG. 14, the fuse state circuit 1410 may determine, utilizing the OR gates 1425 and 1430 and AND gate 1435, that the imaging device 1300 is in the programmed state when at least one of the fuses of the fuse bank 1415 and at least one of the fuses of the fuse bank 1420 are in the programmed state. If these conditions are met, the fuse state circuit 1410 may set the state of the control signal $C_{OP\_st}$ to a logic high (e.g., 1) and store the control signal $C_{OP\_st}$ in a latch 1440. If these conditions are not met, the fuse state circuit 1410 may determine the imaging device 1300 is in the non-programmed state, set the state of the control signal $C_{OP\_st}$ to a logic low (e.g., 0), and store the control signal $C_{OP\_st}$ in the latch 1440.

It is noted that such conditions are provided by way of non-limiting example. In some cases, more, fewer, and/or different arrangement of fuse banks, OR gates, AND gates, other types of gates (e.g., NAND gates, XOR gates), and/or components may be utilized to require a certain combination and/or number of fuses be blown in order for the fuse state circuit 1410 to determine the imaging device 1300 is in the programmed state. As an example, the arrangement of OR gates and AND gates in FIG. 14 may be switched, such that the OR gates 1425 and 1430 are replaced with AND gates and the AND gate 1435 is replaced with an OR gate. As another example, a single fuse bank with a single fuse may be utilized to implement the fuse component 1405, with the latch 1440 storing a state of the single fuse (e.g., the control signal $C_{OP\_st}$ represents the state of the single fuse). In an aspect, requiring a certain number and/or combination of fuses to be blown reduces a probability of accidental blowing of fuses erroneously causing the imaging device 1300 to be in the programmed state when it is actually intended to be in the non-programmed state.

The control signal $C_{OP\_st}$ may be provided to the output logic circuit 1310 and the frame output circuit 1315 to indicate the imaging device 1300 is in the programmed state or non-programmed state. In an aspect, the fuse state circuit 1410 may provide the control signal $C_{OP\_st}$ stored in the latch 1440 to the output logic circuit 1310 and the frame output circuit 1315 upon powering on of the imaging device 1300 and in association with each frame captured by the image detector circuit 305.

Figure 15:
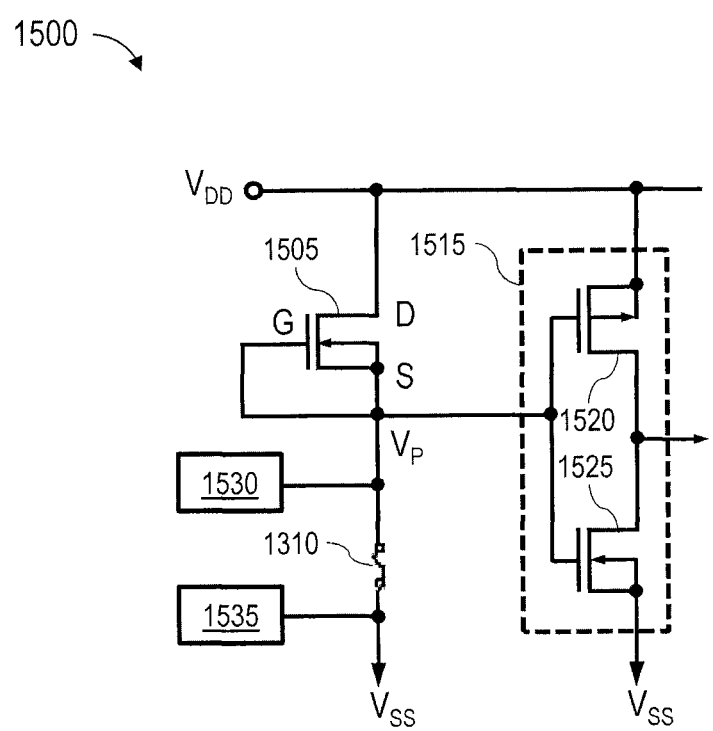
FIG. 15 illustrates an example fuse circuit.

FIG. 15 illustrates an example fuse circuit 1500. The fuse circuit 1500 includes a field effect transistor (FET) 1505 and a fuse 1510. For example, the fuse 1510 may be any one of the fuses of the fuse component 1405. The FET 1505 may be an n-channel depletion type transistor. To provide a function of constant current source, a gate electrode (denoted as G) of the FET 1505 may be connected to its source (denoted as S). The FET 1505 and the fuse 1510 are connected in series between a positive voltage source $V_{DD}$ and a negative voltage source $V_{SS}$. A junction point of the source of the FET 1505 and the fuse 1510 is connected to an input terminal of an inverter 1515, which detects whether the fuse 1510 is blown or not. As an example, in FIG. 15, the inverter 1515 includes complementary metal oxide semiconductor (CMOS) transistors formed of a PMOS transistor 1520 (e.g., an enhancement type PMOS transistor) and an NMOS transistor 1525.

Terminal pads 1530 and 1535 may be utilized to program the fuse 1510. In an aspect, the fuse 1510 is programmed (e.g., blown) by applying a high current at the terminal pads 1530 and 1535. In an embodiment, with reference to FIGS. 13 and 14, the fuse state circuit 1410 may test the fuse 1510 upon powering on of the imaging device 1300 and in association with each frame captured by the image detector circuit 305. A state of the fuse 1510 may be tested through use of the transistor 1505 and the inverter 1515. In this regard, determining whether or not the fuse 1510 has been blown may be performed by checking whether an on-state resistance of the FET 1505 is larger or smaller compared with a resistance of the fuse 1510. When the fuse 1510 is blown, a potential $V_P$ at the junction point rises up to a high potential level (e.g., logic high), and $V_P$ applied to the input of the inverter 1515. An output of the inverter 1515 then becomes low potential level (e.g., logic low). When the fuse 1510 has not been blown, the potential $V_P$ at the junction point is the same potential as the negative voltage source $V_{SS}$, namely the low potential level (e.g., logic low). The output of the inverter 1515 becomes high potential level. In this example, the output of the inverter 1515 being at the high potential level indicates the fuse 1510 has not been blown, and the output of the inverter 1515 being at the low potential level indicates the fuse 1510 has been blown. In an aspect, control lines driven by appropriate supply voltages may be utilized to ensure levels of the terminal pads 1530 and 1535 cannot be manipulated to give a false fuse reading.

It is noted the fuse circuit 1500 of FIG. 15 illustrates one example implementation of a fuse circuit. Other implementations of the fuse circuit, including conventional fuse circuit implementations, may be utilized to implement the fuse(s) of the fuse component 1320. In some cases, a fuse may refer to the fuse circuit 1500 or the fuse 1510 itself.

Figure 16:
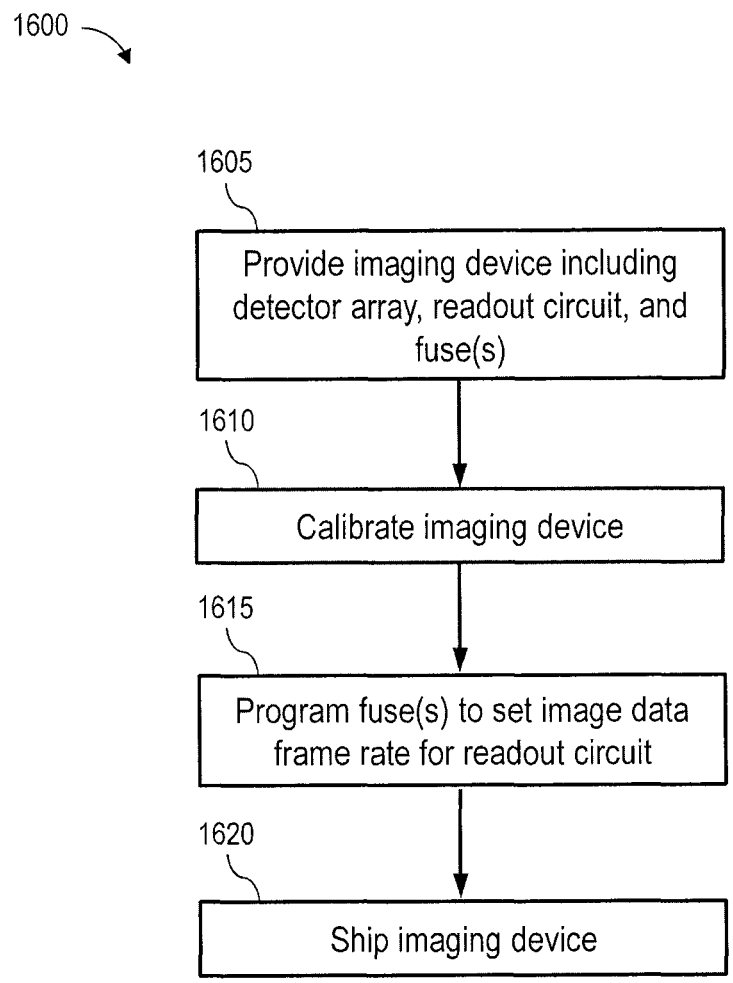
FIG. 16 illustrates a flow diagram of an example process for manufacturing an imaging device in accordance with one or more embodiments of the present disclosure.

FIG. 16 illustrates a flow diagram of an example process 1600 for manufacturing an imaging device in accordance with one or more embodiments of the present disclosure. For explanatory purposes, the example process 1600 is primarily described herein with reference to components of FIG. 13; however, the example process 1600 is not limited to components of FIG. 13. One or more of the blocks of example process 1600 need not be performed.

At block 1605, the imaging device 1300 is provided in a non-programmed state. The imaging device 1300 includes the image detector circuit 305 and the readout circuit 1305. At block 1610, the imaging device 1300 is calibrated. In some cases, the calibration may include performing an FFC event to obtain a set of FFC terms. To perform the FFC event, the image detector circuit 305 may be blocked by the shutter 335. The image detector circuit 305 may provide image data frames of the shutter 335 according to a first frame rate (e.g., 60 Hz) to the readout circuit 1305. The readout circuit 1305 may provide the image data frames according to the first frame rate to processing electronics downstream of the readout circuit 1305. The processing electronics may generate a set of FFC terms based on the image data frames of the shutter 335 received from the readout circuit 1305. The set of FCC terms may be stored (e.g., in the memory 125) for use with image data frames provided by the imaging device 1300. In some cases, alternatively or in addition to calibrating to obtain FFC terms, the imaging device 1300 may be tested for performance and/or calibrated to obtain other calibration terms. For example, as would be understood by one skilled in the art, the calibration may include imaging, by the imaging device 1300 at different ambient temperatures of the imaging device 1300, scenes/targets having a range of temperatures, and generating calibration terms based on these images. Such calibration terms may allow normalization of image data output by the imaging device 1300 over an entire operating temperature range supported by the imaging device 1300).

At block 1615, the fuse program circuit 1330 programs (e.g., blows, sets) one or more fuses of the fuse component 1320 to set a frame rate (e.g., image data frame rate) for the readout circuit 1305. In this regard, programming of the fuse(s) transitions the imaging device 1300 from the non-programmed state to a programmed state. Programming the fuse(s) of the fuse component 1320 may also be referred to as programming the fuse component 1320, programming the readout circuit 1305, programming the imaging device 1300, or other variation. Dependent on fuse technology utilized, the fuse program circuit 1330 may generate appropriate signals (e.g., voltage signals above a certain voltage level, laser signals) to program the fuse(s) and/or generate appropriate control signals to cause such signals to be generated by appropriate circuitry. In one example case, the programmed state of the imaging device 1300 may be defined as a state in which a certain predetermined set of fuses of the fuse component 1320 is programmed. In this example case, the fuse program circuit 1330 may program the fuse component 1320 by setting the predetermined set of fuses. In an embodiment, after the programming, the readout circuit 1305 provides image data frames at a frame rate lower than the first frame rate except for a short burst of frames provided at the first frame rate during operation in burst mode. The image detector circuit 305 may be biased using the same set of bias signals prior to and after the programming.

At block 1620, the imaging device 1300 is shipped. The imaging device 1300 may be shipped as a separate component (e.g., an imaging module installable into a larger imaging system or a device such as a mobile phone) or as part of a system, such as the imaging system 100 (e.g., infrared camera, visible-light camera, multi-waveband camera), portions thereof, or other system. In an aspect, setting of the imaging device 1300 to the programmed state may be performed after calibration of the imaging device 1300 and prior to (e.g., immediately prior to) shipment of the imaging device 1300 (e.g., to a customer). The stored set of FFC terms may be utilized for image data captured by the imaging device 1300 for at least a duration after the imaging device 1300 is programmed. In some cases, the imaging device 1300 may be tested for performance and/or calibrated after programming and prior to shipment.

Figure 17:
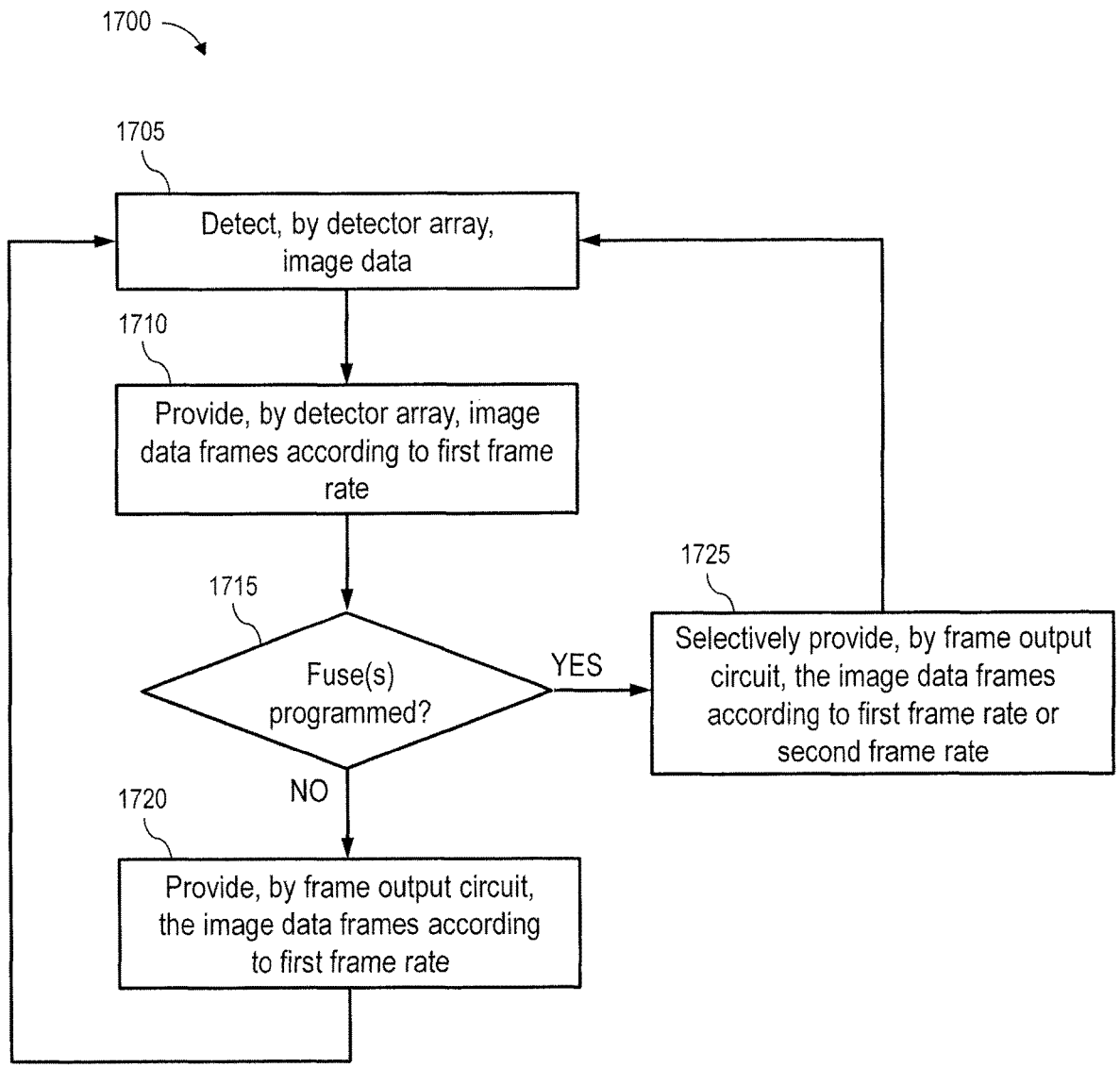
FIG. 17 illustrates a flow diagram of an example process for facilitating fuse state-based frame rate in accordance with one or more embodiments of the present disclosure.

FIG. 17 illustrates a flow diagram of an example process 1700 for facilitating fuse state-based frame rate in accordance with one or more embodiments of the present disclosure. For explanatory purposes, the example process 1700 is primarily described herein with reference to components of FIG. 13; however, the example process 1700 is not limited to components of FIG. 13. The blocks of example process 1700 are described herein as occurring in serial, or linearly (e.g., one after another). However, multiple blocks of example process 1700 may occur in parallel. In addition, the blocks of example process 1700 need not be performed in the order shown and/or one or more of the blocks of example process 1700 need not be performed.

At block 1705, the image detector circuit 305 detects image data (e.g., in the form of EM radiation). At block 1710, the image detector circuit 305 provides image data frames to the readout circuit 1305 according to a first frame rate. At block 1715, the fuse state circuit 1325 determines a state of a fuse(s) of the fuse component 1320. By determining the state of the fuse(s), the fuse state circuit 1325 determines whether the imaging device 1300 is in the non-programmed state or the programmed state. If the determination is that the fuse(s) (e.g., a predetermined set of fuses of the fuse component 1320) has not been programmed, the process proceeds to block 1720. In this case, the imaging device 1300 is in the non-programmed state. At block 1720, the frame output circuit 1315 provides the image data frames from the image detector circuit 305 according to the first frame rate.

If the determination is that the fuse(s) has been programmed, the process proceeds to block 1725. In this case, the imaging device 1300 is in the programmed state. At block 1725, the frame output circuit 1315 selectively provides the image data frames from the image detector circuit 305 according to the first frame rate or a second frame rate lower than the first frame rate. With the imaging device 1300 being determined to be in the programmed state (based on block 1715), the frame output circuit 1315 may provide the image data frames at the first frame rate during burst mode operation and at the second frame rate during image mode operation. In an aspect, in image mode operation the image data detected by the image detector circuit 305 at block 1705 is of the scene 315, and in burst mode operation the image data detected by the image detector circuit 305 at block 1705 is of the shutter 335. In an embodiment, block 1725 may be performed by performing blocks similar to those shown in the process 1100 of FIG. 11.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A device, comprising:
a detector array configured to detect electromagnetic radiation associated with a scene and provide image data frames according to a first frame rate;
a logic circuit configured to determine whether a threshold delay has elapsed since a previous calibration event; and
a frame output circuit configured to:
provide, based at least on the threshold delay having elapsed, the image data frames according to the first frame rate; and
provide, based at least on the threshold delay not having elapsed, the image data frames according to a second frame rate lower than the first frame rate.

2. The device of claim 1, wherein the frame output circuit is configured to provide frames at an output frame rate equal to the first frame rate by providing blank frames interspersed with the image data frames provided according to the second frame rate, wherein the blank frames do not contain image data associated with the electromagnetic radiation.

3. The device of claim 1, wherein the frame output circuit is configured to, based at least on the threshold delay not having elapsed, provide the image data frames according to the second frame rate by, for each of these image data frames:
nullifying image data of the electromagnetic radiation from a number of the image data frames to obtain a number of blank frames;
providing the number of blank frames according to the first frame rate; and
providing the image data frame after a last blank frame of the number of blank frames.

4. The device of claim 1,
wherein the frame output circuit is configured to provide, based at least on the threshold delay having elapsed, a predetermined number of the image data frames according to the first frame rate; and
wherein after a last frame of the predetermined number of the image data frames has been provided by the frame output circuit:
the logic circuit is further configured to determine whether the threshold delay has elapsed since the last frame was provided; and
the frame output circuit is further configured to:
provide, based at least on the threshold delay having elapsed since the last frame was provided, the image data frames according to the first frame rate; and
provide, based at least on the threshold delay not having elapsed since the last frame was provided, the image data frames according to the second frame rate.

5. The device of claim 1, further comprising a processing circuit configured to generate flat-field correction terms based on the image data frames provided by the frame output circuit according to the first frame rate.

6. The device of claim 1, wherein
the logic circuit is further configured to determine whether a command signal has been received; and
the frame output circuit configured to:
when the threshold delay has elapsed and the command signal has been received, provide a predetermined number of the image data frames according to the first frame rate; and
when the threshold delay has not elapsed and/or the command signal has not been received, provide the image data frames according to the second frame rate by, for each of these image data frames:
nullifying image data of the electromagnetic radiation from a number of the image data frames to obtain a number of blank frames;
providing the number of blank frames according to the first frame rate; and
providing the image data frame after a last blank frame of the number of blank frames.

7. The device of claim 6, wherein:
the logic circuit is further configured to:
adjust a counter value in response to each of the image data frames; and
generate an enable signal based on a comparison of the counter value with a threshold value, wherein the enable signal has a first state or a second state based on the comparison, and wherein the threshold value is associated with the second frame rate; and
the frame output circuit is configured to:
provide one of the image data frames when the enable signal has the first state; and
provide one of the blank frames when the enable signal has the second state.

8. The device of claim 7, wherein the logic circuit is configured to, for each frame of the image data frames:
detect an end of frame (EOF) signal associated with the frame; and
adjust the counter value in response to detecting the EOF signal.

9. The device of claim 7, wherein:
the threshold delay is a threshold time duration; and
the logic circuit is further configured to:
track an amount of the threshold time duration that has elapsed; and
in response to a reset and/or a power-on of the detector array, the logic circuit, and/or the frame output circuit, reset the counter value and the amount of the threshold time duration that has elapsed.

10. The device of claim 6, wherein the logic circuit is further configured to:
receive the command signal; and
ignore the command signal when the threshold delay has not elapsed,
wherein the command signal is received in response to user input to transition the device from image mode operation to burst mode operation.

11. The device of claim 1, further comprising a readout circuit, wherein:
the readout circuit comprises:
the logic circuit;
the frame output circuit;
a fuse configured to set a frame rate for the frame output circuit; and
a fuse state circuit configured to determine a state of the fuse, wherein the frame rate for the readout circuit is based at least on the state of the fuse; and
the detector array comprises a plurality of microbolometers.

12. The device of claim 1, wherein the frame output circuit is configured to provide, during the previous calibration event, frames according to the first frame rate.

13. A device, comprising:
a detector array configured to detect electromagnetic radiation associated with a scene and provide image data frames according to a first frame rate;
a logic circuit configured to determine whether a threshold delay has elapsed; and
a frame output circuit configured to:
provide, based at least on the threshold delay having elapsed, the image data frames according to the first frame rate; and
provide, based at least on the threshold delay not having elapsed, the image data frames according to a second frame rate lower than the first frame rate; and
a shutter configured to be positioned to block the detector array based at least on the threshold delay having elapsed, wherein each of the image data frames provided by the frame output circuit according to the first frame rate comprises image data of the shutter.

14. The device of claim 13, wherein each of the image data frames provided according to the second frame rate comprises image data of the electromagnetic radiation associated with the scene.

15. A method, comprising:
detecting, by a detector array, electromagnetic radiation associated with a scene;
providing, by the detector array, image data frames according a first frame rate;
determining whether a threshold delay has elapsed since a previous calibration event;
providing, by a readout circuit based at least on the threshold delay having elapsed, the image data frames according to the first frame rate; and
providing, by the readout circuit based at least on the threshold delay not having elapsed, the image data frames according to a second frame rate lower than the first frame rate.

16. The method of claim 15, wherein the providing the image data frames according to the second frame rate comprises, for each of these image data frames:
nullifying image data of the electromagnetic radiation from a number of the image data frames to obtain a number of blank frames;
providing the number of blank frames according to the first frame rate; and
providing the image data frame after a last blank frame of the number of blank frames.

17. The method of claim 15, wherein the providing, by the readout circuit, the image data frames according to the first frame rate comprises providing a predetermined number of the image data frames, the method further comprising:
determining whether the threshold delay has elapsed since a last frame of the predetermined number of the image data frames was provided; and
generating an enable signal based on whether the threshold delay has elapsed since the last frame was provided.

18. The method of claim 15, further comprising:
positioning a shutter to block the detector array based at least on the threshold delay having elapsed, wherein each of the image data frames provided by the readout circuit according to the first frame rate comprises image data of the shutter; and generating flat-field correction terms based on the image data frames provided by the readout circuit according to the first frame rate.

19. The method of claim 15, further comprising:

determining whether a command signal has been received; and providing, by the readout circuit when the threshold delay has not elapsed and/or the command signal has not been received, blank frames independent of the detected electromagnetic radiation, wherein:
   the providing the image data frames by the readout circuit according to the first frame rate is in response to the threshold delay having elapsed and the command signal having been received; and
   the providing the image data frames according to the second frame rate is in response to the threshold delay not having elapsed and/or the command signal not having been received.

20. The method of claim 19, further comprising:

adjusting a counter value in response to each of the image data frames; and generating an enable signal based on a comparison of the counter value with a threshold value, wherein the enable signal has a first state or a second state based on the comparison, and wherein the threshold value is associated with the second frame rate;

wherein:
   one of the image data frames is provided by the readout circuit when the enable signal has the first state; and
   one of the blank frames is provided by the readout circuit when the enable signal has the second state.

* * * * *